(12) United States Patent
Petersohn

(10) Patent No.: US 8,189,114 B2
(45) Date of Patent: May 29, 2012

(54) AUTOMATED METHOD FOR TEMPORAL SEGMENTATION OF A VIDEO INTO SCENES WITH TAKING DIFFERENT TYPES OF TRANSITIONS BETWEEN FRAME SEQUENCES INTO ACCOUNT

(75) Inventor: Christian Petersohn, Berlin (DE)

(73) Assignee: Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 1010 days.

(21) Appl. No.: 12/142,029

(22) Filed: Jun. 19, 2008

(65) Prior Publication Data
US 2008/0316307 A1   Dec. 25, 2008

(30) Foreign Application Priority Data
Jun. 20, 2007  (DE) .......................... 10 2007 028 175

(51) Int. Cl.
*H04N 5/14*  (2006.01)
*H04N 5/93*  (2006.01)
*H04N 7/18*  (2006.01)
*G06K 9/34*  (2006.01)

(52) U.S. Cl. .................... 348/700; 375/240.14; 348/135; 382/173; 386/278

(58) Field of Classification Search .................. None
See application file for complete search history.

(56) References Cited

U.S. PATENT DOCUMENTS

| | | | |
|---|---|---|---|
| 5,485,611 A | 1/1996 | Astle | |
| 5,537,528 A | 7/1996 | Takahashi et al. | |
| 6,724,933 B1 * | 4/2004 | Lin et al. | 382/164 |
| 6,940,910 B2 | 9/2005 | Jun et al. | |
| 2001/0021276 A1 | 9/2001 | Zhou | |
| 2002/0126224 A1 * | 9/2002 | Lienhart | 348/700 |
| 2003/0123541 A1 | 7/2003 | Jun et al. | |

FOREIGN PATENT DOCUMENTS

| | | |
|---|---|---|
| DE | 102 52 731 A1 | 5/2004 |
| EP | 0 690 413 A2 | 1/1996 |
| EP | 1 021 041 A2 | 7/2000 |
| EP | 1 722 371 A1 | 11/2006 |
| WO | 00/51078 A2 | 8/2000 |

(Continued)

OTHER PUBLICATIONS

Wikipedia: "Windows® Movie Maker".*

(Continued)

*Primary Examiner* — Wen-Tai Lin
(74) *Attorney, Agent, or Firm* — Keating & Bennett, LLP

(57) ABSTRACT

The automated detection of scene boundaries supports the user in browsing a video. Establishing the similarity between two respective frame sequences is made by choosing and comparing respective key-frames from each frame sequence, which are temporally as far apart from each other as possible but lie outside gradual transitions. Additionally or alternatively, film grammar- and probability-based taking into account of all types of transitions with respect to their separating and/or merging effect on the frame sequences surrounding the transitions and a differently weighted incorporation of the effects of the different types of transitions into uniting frame sequences k into scenes is provided. Thus, all types of transitions are incorporated in determining frame sequence boundaries as scene boundaries with a corresponding weighting, both their separating and merging effect is taken into account, and this knowledge is introduced on a probability basis into the decision in existing scene detection methods.

19 Claims, 10 Drawing Sheets

FOREIGN PATENT DOCUMENTS

WO    2007/072347 A2    6/2007

OTHER PUBLICATIONS

Official communication issued in counterpart International Application No. PCT/EP2008/004873, mailed on Oct. 9, 2008.

Yeung et al.: "Segmentation of Video by Clustering and Graph Analysis," Computer Vision and Image Understanding; vol. 71, No. 1; Jul. 1998; pp. 94-109.

Petersohn: "Video Structure Detection," XP 002497647; Heinrich-Hertz-Institut; http://www.hhi.fraunhofer.de/fileadmin/user_upload/HHI-Website/abteilungen/im-interaktive-medien-human-factors/produkte/videoarchivierung/art/VideoStructureDetection.pdf; Sep. 25, 2008.

Official communication issued in counterpart International Application No. PCT/EP2008/004873, mailed on Jan. 29, 2009.

Truong et al.: "Scene Extraction in Motion Pictures," IEEE Transactions on Circuits and Systems for Video Technology; vol. 13, No. 1; Jan. 1, 2003; pp. 5-15.

Petersohn: "Fraunhofer HHI At TRECVID 2004: Shot Boundary Detection System," TREC Video Retrieval Evaluation Online Proceedings; TRECVID; Nov. 2004; 5 pages.

Petersohn: "Dissolve Shot Boundary Determination," Proc. IEE European Workshop on the Integration of Knowledge, Semantics and Digital Media Technology; 2004; 8 pages.

Petersohn: "Wipe Shot Boundary Determination," Storage and Retrieval Methods and Applications for Multimedia; Dec. 2004; 10 pages.

Petersohn: "Sub-Shots—Basic Units of Video," IEEE International Conference on Systems, Signals & Image Processing, and EURASIP Conference Focused on Speech and Image Processing, Multimedia Communications and Services; Jun. 27-30, 2007; 4 pages.

Truong et al.: "Film Grammar Based Refinements to Extracting Scenes in Motion Pictures," IEEE International Conference on Multimedia and Expo, ICME, 2002; vol. 1; Aug. 2002; pp. 281-284.

Lu et al.: "An Integrated Correlation Measure for Semantic Video Segmentation," Proc. IEEE International Conference on Multimedia and Expo, ICME, 2002; pp. 57-60.

Aigrain et al.: "Medium Knowledge-Based Macro-Segmentation of Video Into Sequences," M.T. Maybury, ed. Intelligent Multimedia Information Retrieval; Mar. 1, 1996; pp. 1-14.

Hanjalic et al.: "Automated High-Level Movie Segmentation for Advanced Video-Retrieval Systems," IEEE Transactions on Circuits and Systems for Video Technology; vol. 9, No. 4; Jun. 1999; pp. 580-588.

Rui et al.: "Contructing Table-of-Content for Videos," Multimedia Systems; vol. 7, No. 5; Sep. 1999; 26 pages.

Truong et al.: "Neighborhood Coherence and Edge Based Approaches to Film Scene Extraction," IEEE International Conference on Pattern Recognition; vol. 2; 2002; pp. 350-353.

* cited by examiner

FIGURE 5B  $coh(k)$

FIGURE 5C  $stta_{t,sep}(k)$

FIGURE 5D  $coh_{modsep}(k)$

FIGURE 5E  $stta_t(k)$

FIGURE 5F  $coh_{mod}(k)$

AUTOMATED METHOD FOR TEMPORAL SEGMENTATION OF A VIDEO INTO SCENES WITH TAKING DIFFERENT TYPES OF TRANSITIONS BETWEEN FRAME SEQUENCES INTO ACCOUNT

CROSS-REFERENCE TO RELATED APPLICATIONS

This application claims priority from German Patent Application No. 102007028175.9, which was filed on Jun. 20, 2007, and is incorporated herein in its entirety by reference, and further the publications Christian Petersohn. Logical unit and scene detection: a comparative survey. IS&T/SPIE Electronic Imaging 2008, Multimedia Content Access: Algorithms and Systems II, San Jose, Calif., USA, 2008, and Christian Petersohn. Improving scene detection by using gradual shot transitions as cues from film grammar. IS&T/SPIE Electronic Imaging 2008, Multimedia Content Access Algorithms and Systems II, San Jose, Calif., USA, 2008, are incorporated herein by reference.

BACKGROUND OF THE INVENTION

The invention relates to an automated method for temporal segmentation of a video into scenes with uniting frame sequences by detecting frame sequence boundaries as scene boundaries, wherein different types of transitions occur at the frame sequence boundaries and the frame sequence boundaries and transitions are known according to position, type and length.

The automated detection of scene boundaries and, thus, scenes serves to support the user in browsing a video, make the content available to him faster and better, allow to compile a kind of a contents directory and further (automated or manual) analyses and annotations. Scenes include a series of frame sequences, as a rule, shots (see below), and are characterized by an event taking place in one setting in a continuous period of time. In this context, the term "scenes" (or "logical story unit") is used in fictional, narrative videos (e.g. features, sitcoms, animated cartoons). By analogy, in non-fictional videos (e.g. news, documentaries, educational films, music and sports programs), the term "topic unit" or "topic" is used. "Logical unit" (or "story unit") is the umbrella term for "scenes" and "topic units". However, this term is not consistently established among the experts, so that in the following, the term "scene" will be used with reference to all videos independently of their content. Furthermore, the terms "video" and "film" as well as "video frame" and "frame" will be compatibly with each other.

The segmentation of videos into scenes by uniting particular frame sequences is the subject of the present invention. Thus, it has to be detected which frame sequence boundaries are scene boundaries at the same time. As a rule, scenes are comprised of shots as particular frame sequences. However, a scene boundary may also lie within a shot. In a segmentation, however, the same is only detected if the shot is divided into individual sub-shots (as a frame sequence subordinate to a frame sequence shot) and if it is checked whether a sub-shot boundary is a scene boundary the same time. Thus, a scene boundary may also lie on a sub-shot boundary in the middle of a shot. However, no gradual transitions based on film grammar occur at sub-shot boundaries. In the following, sub-shot transitions will be correspondingly treated as transitions of the CUT type. Knowledge of the individual shots or sub-shots and their transitions according to position, length and type is a prerequisite for applying the method according to the invention. In the following, a detection of shot boundaries and associated shot transitions will be presumed. The method according to the invention may also be applied to sub-shot boundaries and sub-shot transitions if these are known according to temporal position, type and length by a corresponding detection method. In the following, the term "frame sequence" will be used both for "shot" and the term "sub-shot".

A frame sequence boundary is established video-frame accurately, that is, it lies exactly between two successive video frames. "Transitions" are transitions between frame sequences. They correspond to the frame sequence boundary or include the same. Four different types of transitions are to be distinguished: the CUT type is a hard, abrupt cut. The CUT is established video-frame accurately and corresponds to the frame sequence boundary. In contrast to this abrupt transition, three gradual, continuous transitions exist between shots as frame sequences: the DISSOLVE type as a dissolve (a frame is slowly completely faded out, while another frame is faded in at the same speed): the FADE type as a fade-out or fade-in into a black frame, and the WIPE type as a wipe fade, wherein a frame is displaced from the screen by a new frame shifting into the screen to the same degree. Parts of the old frame may also be replaced one after the other with parts of the new frame. In this process, one or several boundaries traverse the screen (e.g. according to the principle of a "windscreen wiper"). The gradual transitions mentioned represent the most frequently occurring transitions used in film grammar. However, also other gradual transitions exist which by analogy are incorporated into the present invention.

In general, different methods for temporal segmentation of a video into scenes are known. One has to distinguish between methods for scene segmentation based on visual properties, in particular, the similarity between individual shots (similarity-based methods, e.g. overlapping links, clustering, time-adaptive grouping, graph-based); coherence methods (video coherence/decision curve), in which coherence values for particular points (often shot boundaries) as a measure for the consistency (coherence) of the video content before and after this point (minimum coherence values indicate scene boundaries), and rule- and model-based methods, which, however, play only an insignificant role in scene segmentation. In the following, methods for scene segmentation will be considered which are either similarity- or coherence-based.

For example, methods for finding shot boundaries with taking the shot transitions into account according to position, type and length are known from:
Publication I: C. Petersohn. "Fraunhofer HHI at TRECVID 2004: Shot Boundary Detection System", TREC Video Retrieval Evaluation Online Proceedings, TRECVID, 2004,
Publication II: C. Petersohn. "Dissolve Shot Boundary Determination", Proc. IEE European Workshop on the Integration of Knowledge, Semantics and Digital Media Technology, pp. 87-94, London, UK, 2004, and
Publication III: C. Petersohn. "Wipe Shot Boundary Determination", Proc. IS&T/SPIE Electronic Imaging 2005, Storage and Retrieval Methods and Applications for Multimedia, pp. 337-346, San Jose, Calif., 2005.
A method for finding sub-shot boundaries and sub-shot transitions is known from publication IV: C. Petersohn. "Sub-Shots—Basic Units of Video", Proc. IEEE International Conference on Systems, Signals and Image Processing, and EUR-ASIP Conference Focused on Speech and Image Processing, Multimedia Communications and Services, Maribor, Slovenia, Jun. $27^{th}$ to $29^{th}$, 2007.

Further, US 2003/0123541 A1, US 2001/0021276 A1, EP 1 021 041 B1, DE 60119012 T2 and DE 102 527 31 A1 specify methods for finding shot transitions. Thus, such methods are sufficiently known from the art and do not need to be further explained. It may be assumed that one skilled in the art will know the information about the temporal position of frame sequence boundaries and the type and the length of transitions at the frame sequence boundaries needed for performing the method according to the invention.

Furthermore, there are some methods for scene detection in the art, which, however, as a rule are based on the visual similarity of shots within scenes. Partly, also audio or text are analyzed. However, there are three publications in which different types of shot transitions are utilized for scene detection. From publication V by Truong, B. T., Venkatesh, S., Dorai, C. (2002) "Film grammar based refinements to extracting scenes in motion pictures" (IEEE International Conference on Multimedia and Expo. ICME, 02, Vol. 1, pp. 281-284) it is known to use all FADES and add their positions as scene boundaries to the list of the scene boundaries otherwise detected. As such, FADES are accepted exclusively with a separating effect. Additionally, other types of shot transitions are ignored, although in publication VI by Lu, X., Ma, Y.-F., Zhang, H.-J., and Wu, L. (2002) "An integrated correlation measure for semantic video segmentation" (Proc. IEEE International Conference on Multimedia and Expo, ICME'02, Lausanne, Switzerland) it is mentioned that WIPES might be taken into account in the segmentation with a separating effect ("disjunction"). However, here, too, not all types of shot transitions are considered and an exclusively separating effect is taken into account. The reliability of the different types of gradual transitions for the indication of scene boundaries is not examined in detail either. An integration occurs exclusively for the coherence-based method described in publication VI. In publication VII by Aigrain, P., Joly, P., Longueville, V. (1997) "Medium knowledge-based macro-segmentation of video into sequences" (in M. T. Maybury, ed., Intelligent Multimedia Information Retrieval. AAAI/MIT Press), two rules (transition effect rules 1 and 3) are defined with respect to scene boundaries. Rule 1: For each stand-alone gradual shot transition, a scene boundary is inserted. Rule 2: For each series of gradual shot transitions, a scene boundary is inserted before and after it, if needed. However, there is a problem in that in this context, each gradual transition is used as an equally reliable indicator for scene boundaries and gradual transitions, which were wrongly detected beforehand by the automated shot detection, are marked as scene boundaries. By these rigid rules, the method is not sufficiently robust.

Furthermore, there are different scene detection methods utilizing one or several video frames per shot to ascertain the similarity between two adjacent shots. If there is great similarity (in relation to a predetermined threshold value), this implies that both the shots belong to a common scene. The shot boundary between these two shots is not detected as a scene boundary. If there is no great similarity, the shot boundary is detected as a scene boundary. Both in publication VIII by Hanjalic, A., Lagendijk, R. L., Biemond, J. (1999): "Automated high-level movie segmentation for advanced video-retrieval systems" (IEEE Trans. on Circuits and Systems for Video Technology, 9(4):580-588) and in publication IX by Rui, Y., Huang, T. S., Mehrotra, S. (1999): "Constructing table-of-content for videos" (Multimedia Syst, 7(5):359-368), exactly two video frames are respectively utilized for a similarity analysis. In this context, basically the first and the last frame in a shot are chosen. Here, gradual shot transitions are not taken into account.

A further coherence-based method for scene detection is described in publication X by Truong, B. T., Venkatesh, S., and Dorai, C. (2002): "Neighborhood coherence and edge based approach for scene extraction in films" in (IEEE International Conference on Pattern Recognition (ICPR'2002), volume 2, pages 350-353, Quebec. Here, scene boundaries are inserted for all coherence values below a fixed threshold value.

However, the mentioned approaches for ascertaining shot boundaries as scene boundaries, on which the present invention relies as the closest known art, are based on rigid fixed rules and, in part, on threshold values and produce errors in the detection of scene boundaries as soon as the examined frame sequences are not subject to these rules or threshold values. Additionally, these approaches only insufficiently utilize the information available in a video for scene segmentation.

SUMMARY

An embodiment may have a method for temporal segmentation of a video into scenes with uniting frame sequences by detecting frame sequence boundaries as scene boundaries, wherein different types of transitions occur at the frame sequence boundaries and the frame sequence boundaries and transitions are known according to position and length, with establishing the similarity between two respective frame sequences by choosing and comparing at least one key-frame per frame sequence of the two respective frame sequences, which is outside of the transitions.

Another embodiment may have a method for temporal segmentation of a video into scenes with uniting frame sequences by detecting frame sequence boundaries as scene boundaries, wherein different types of transitions occur at the frame sequence boundaries and the frame sequence boundaries and transitions are known according to position and type, with film grammar- and probability-based taking into account of the different types of transitions between frame sequences with respect to their separating and/or merging effect on the frame sequences surrounding the transitions and a correspondingly weighted incorporation of the effects of the different types of transitions into the uniting of frame sequences into scenes.

According to another embodiment, a method of determining a similarity between a first and a second frame sequence among frame sequences of a video may have the steps of: choosing one or more key-frames in the first frame sequence among the frames of the first frame sequence outside frame sequence transitions at frame sequence boundaries of the first frame sequence; choosing one or more key-frames in the second frame sequence among frames of the second frame sequence outside frame sequence transitions at frame sequence boundaries of the second frame sequence; and using the chosen key-frames of the first and second frame sequences in determining a similarity between the first and second frame sequences such that the similarity determined depends on the choice of the key-frames in the first and second frame sequences.

According to another embodiment, a method of segmenting a video into scenes may have the steps of: uniting consecutive frame sequences of the video into scenes depending on types of frame sequence transitions at frame sequence boundaries between the frame sequences, the types distinguishing, at least, between gradual and abrupt frame sequence transitions.

According to another embodiment, a method of segmenting a video into scenes may have the steps of: performing an initial scene detection by uniting consecutive frame sequences of the video into scenes; determining as to whether a positive correlation exists between the occurrence of gradual frame sequence transitions and scene boundaries between the scenes of the initial scene detection; and performing a further scene detection by uniting consecutive frame sequences into scenes depending on the respective frame sequence transitions being a gradual frame sequence transition or not.

According to another embodiment, an apparatus for determining a similarity between a first and a second frame sequence among frame sequences of a video may have: a first key-frame chooser for choosing one or more key-frames in the first frame sequence among the frames of the first frame sequence outside frame sequence transitions at frame sequence boundaries of the first frame sequence; a second key-frame chooser for choosing one or more key-frames in the second frame sequence among frames of the second frame sequence outside frame sequence transitions at frame sequence boundaries of the second frame sequence; and a similarity meter for using the chosen key-frames of the first and second frame sequences in determining a similarity between the first and second frame sequences such that the similarity determined depends on the choice of the key-frames by the first and second key-frame choosers.

Another embodiment may have a video scene detector for segmenting a video into scenes, the video scene detector being configured to unite consecutive frame sequences of the video into scenes depending on types of frame sequence transitions at frame sequence boundaries between the frame sequences, the types distinguishing, at least, between gradual and abrupt frame sequence transitions.

Thus, embodiments of the present invention further develop the generic automated method for temporal segmentation of a video into scenes by uniting frame sequences, described at the beginning, such that errors in the detection of scene boundaries are largely avoided and, thus, the accuracy and robustness of the method are significantly improved. At the same time, the method should be simple to implement and performable in a timely manner. The inventive solution to this object may be taken from the method claim. Advantageous further developments are shown in the dependent claims and in the following will be detailed in conjunction with the invention.

In the inventive method, a substantial improvement of the correct detection of frame sequence boundaries as scene boundaries is already achieved by the fact that establishing the similarity between two respective frame sequences (similarity analysis) is made by choosing and comparing video key-frames from each frame sequence which are temporally as far apart from each other as possible to optimally cover the visual variability of the frame content. At the same time, however, they have to lie outside of gradual transitions. This is needed since the similarity of two video frames outside of gradual transitions strongly varies from the similarity of two video frames within gradual transitions. Choosing video key-frames within gradual transitions leads to misinterpretations when searching the scene boundaries.

In order to be able to correspondingly choose the video key-frames to be used for the similarity analysis, the position and duration of the respectively occurring transitions at the frame sequence boundaries need to be known. Here, abrupt transitions of the CUT type have a duration of 0 (zero) video frames, since here, an abrupt change takes place between two successive video frames. Gradual transitions have a limited duration of x>0 video frames.

If the methods used for ascertaining the frame sequence boundaries do not provide any, or faulty, indications concerning the duration of the transitions, it is advantageous to choose video key-frames which lie at least a number of x video frames before or after the respective frame sequence boundary. For example, x=5 may be indicated. Here, with a transition duration wrongly detected too short, it is avoided that video key-frames within the gradual transition are chosen, or at least it is ensured that the video key-frames do not lie too close to the frame sequence boundaries in the middle of gradual transitions. Here, the chosen video key-frames may be advantageously utilized for a similarity analysis, and the robustness of the scene boundary detection to errors in detecting frame sequence boundaries and transitions is improved.

The number of the video key-frames to be chosen is not necessarily predetermined. It may range from one video frame per frame sequence to the number of the video frames present in a frame sequence. For example, exactly two video key-frames may be chosen for each frame sequence. The above rules then mean that they should be as far apart from each other as possible, that is, a video frame from the beginning of the frame sequence and one from the end of the frame sequence is chosen, wherein they have to lie at least x (e.g. x=5) frames from the frame sequence boundary and, additionally, also outside of the transitions.

The inventive procedure previously explained, in the following also referred to as "first inventive measure", already yields a substantial improvement in the avoidance of errors for a correct detection of scene boundaries by taking the length of transitions at the frame sequence boundaries into account. However, the error rate may also be significantly reduced if, according to the invention, a film grammar- and probability-based taking of all types of transitions into account with respect to their separating or linking, or merging, effect on the surrounding frame sequences and a differently weighted incorporation of the effects of the different types of transitions into uniting frame sequences to scenes are performed.

In this context, this "second inventive measure" may be performed alternatively or additionally to the first inventive measure previously explained. If both inventive measures are performed together, an optimum reduction in the error rate in the automated detection of scene boundaries may be achieved.

In the second inventive measure,
all types of transitions are incorporated in the determination of frame sequence boundaries as scene boundaries, with a corresponding, possibly different weighting, which corresponds to an interpretation of the film grammar underlying the video,
both the separating and the linking effect of transitions between adjacent frame sequences are taken into account and
these different effects of the transitions are introduced on a probability basis into the decision in existing scene detection methods.

This second inventive measure is based on the knowledge that transitions, in particular gradual transitions, which frequently are intentionally employed by the editor of a video according to the film grammar, may have both a separating and a linking effect between two frame sequences, so that the corresponding frame sequence boundary may be a scene boundary or not. These connections may be detected by help of probability considerations.

The following explanations relate to shots as particular frame sequences. This may be explained by the fact that the knowledge concerning the probability considerations is initially present only in the field of shot detection and detection of shot transitions according to length and type. An analog approach to sub-shots as particular frame sequences in the form of subsets of shots, however, is easily possible. For supporting the corresponding probability considerations, the sub-shot boundaries and transitions are to be included by analogy. In this context, a consideration of sub-shot boundaries is only relevant if a scene boundary lies within a shot.

Table 1 shows a list of the scene and shot boundaries in dependence on the kind of video in which they occur (opt: optional further scene boundaries, # number), performed on a test set of different chosen programs.

TABLE 1

| Kind | length h:min:s | # scene boundaries sb #sb | #opt sb | # shot boundaries |
|---|---|---|---|---|
| feature + advertisement | 1:00:00 | 73 | 28 | 869 |
| children's | 0:27:34 | 14 | 6 | 302 |
| program | 0:26:25 | 18 | 3 | 321 |
| sitcom | 0:46:52 | 21 | 12 | 645 |
|  | 0:41:13 | 31 | 8 | 557 |
|  | 0:22:13 | 11 | 7 | 176 |
| animated cartoon | 0:20:31 | 18 | 8 | 175 |
|  | 0:23:34 | 15 | 3 | 147 |
| total | 4:28:22 | 201 | 75 | 3192 |

An evaluation of the shot boundaries, which initially were automatically detected and then manually corrected, yielded the following association with the individual types of shot transitions according to table 2. In this context, P(sttype) refers to the probability for a particular type of shot transition to occur in a particular program or, specifically, for a shot transition occurring in a particular program to be of the CUT, FADE, DISSOLVE or WIPE type.

TABLE 2

| P(sstype) | CUT | FADE | DISSOLVE | WIPE |
|---|---|---|---|---|
| feature + advertisement | 88.95% | 3.68% | 4.95% | 2.42% |
| children's program | 91.33% | 4.49% | 2.57% | 1.61% |
| sitcom | 96.81% | 1.45% | 1.67% | 0.07% |
| animated cartoon | 90.99% | 3.73% | 5.28% | 0.00% |
| total | 93.01% | 2.88% | 3.10% | 1.00% |

The shot transitions occurring in the test set are at 93.01% of the CUT type, at 2.88% of the FADE type, at 3.1% of the DISSOLVE type and at 1% of the WIPE type.

Table 3 depicts the probability for a particular type of shot transition to occur at a scene boundary. Specifically, P(sstype|scb) in table 3 is the conditional probability for a particular type of shot transition to be present if the shot transition is a scene boundary at the same time.

TABLE 3

| P(sstype|scb) | CUT | FADE | DISSOLVE | WIPE |
|---|---|---|---|---|
| feature + advertisement | 52.48% | 29.70% | 1.98% | 15.84% |
| children's program | 17.07% | 68.29% | 9.76% | 4.88% |
| sitcom | 61.11% | 21.11% | 17.78% | 0.00% |
| animated cartoon | 40.91% | 25.00% | 34.09% | 0.00% |
| total | 48.19% | 31.88% | 13.41% | 6.52% |

The shot boundaries coinciding with the scene boundaries in the test set are at 48.19% of CUT type, at 31.88% are of the FADE type, etc. If the probabilities P(sttype|scb) according to table 3 are compared to the probabilities P(sttype) according to table 2, that is, to the total occurrence (line "total") of different types of shot transitions, it follows that the probability for a gradual shot transition to occur at a scene boundary is much higher than its general occurrence. In contrast, the reverse applies for the transitions of the CUT type.

Table 4 shows the conditional probability P (scb|sttype) for a scene boundary to lie on a particular type of shot transition.

TABLE 4

| P(scb|sttype) | CUT | FADE | DISSOLVE | WIPE |
|---|---|---|---|---|
| feature + advertisement | 6.86% | 93.75% | 4.65% | 76.19% |
| children's program | 1.23% | 100% | 25.00% | 20% |
| sitcom | 4.12% | 95.00% | 69.57% | 0.00% |
| animated cartoon | 6.14% | 91.67% | 88.24% | — |
| total | 4.48% | 95.65% | 37.37% | 56.25% |

If the type of shot transition is not known, the chance of a scene boundary to lie on a predetermined shot transition is P(scb)=8.65% (201 secure and 75 optional scene boundaries divided by 3192 shot boundaries, compare table 1). If the type of the shot transition is known, however, the probability for a scene boundary to lie on the corresponding shot transition is 4.48% for CUTS, 95.65% for FADES, 37.37% for DISSOLVES and 56.25% for WIPES. Thus, almost each FADE is a scene boundary.

The results of tables 2 to 4 show that in most programs, shot transitions are not employed randomly, but intentionally when editing. In particular, gradual shot transitions (FADE, DISSOLVE, WIPE) seem to be often utilized to indicate important content changes, which then correlate with scene boundaries.

The term film grammar designates the rules and conventions generally used when producing films and videos. Film grammar is intentionally employed as a stylistic means for composition and in editing. As shown by the consideration of the probabilities (tables 2 to 4), gradual shot transitions are employed, for example, to indicate global changes (scene changes in particular). Thus, there is a direct relation between film grammar and content. The occurring transitions are correspondingly content-related. In videos not edited according to film grammar (e.g. uncut home videos) or in films in which gradual transitions between frame sequences are employed as a purely artistic element without any relation to the content or intentionally contradictory to the content, only the first inventive measure leads to a significant improvement of the scene detection, since this measure is independent of a film grammar. While the inventive choice of video key-frames outside of transitions decreases the error rate in the detection of scene boundaries in these videos, too, the second inventive measure of the probability-based weighting of the separating and linking effect of different types of transition is contraproductive as a rule, since here, there is no relation between occurring types of transition and the content.

Thus, in order to be able to apply the inventive method with both mentioned measures for achieving an optimum scene segmentation, it is advantageous to check beforehand in the video to be segmented whether it was edited according to the film grammar and whether the occurring types of transition have a relation to the video content. In the invention, this is advantageously detected by the fact that a positive correlation between gradual transitions and scene boundaries may be established or a series of successive frame sequences is linked, or merged, by gradual transitions. Thus, an examination of the content relation of the types of transition between the frame sequences may be made by ascertaining a relationship between gradual transitions and scene boundaries or ascertaining a sequence of gradual transitions. If these automatic check yields that the video was edited according to film grammar and provided with gradual transitions between the frame sequences, then both inventive measures will be applied. Otherwise, only the first inventive measure for an improved choice of the video key-frames will be applied.

BRIEF DESCRIPTION OF THE DRAWINGS

Embodiments of the present invention will be detailed subsequently referring to the appended drawings, in which.

DETAILED DESCRIPTION OF THE INVENTION

Choice of the Best Video Key-frames for the Similarity Analysis

Different similarity measures may be used for performing a similarity analysis between two frame sequences A and B. In general, the similarity between video key-frames of the both frame sequences is determined. For this, X video key-frames $kf_{Ax}$ are chosen from frame sequence A, and Y video key-frames $kf_{By}$ are chosen from frame sequence B. For example, the color or edge similarity may then be used as a similarity measure. The following formula holds true:

$$sim(shotA, shotB) = \max_{x=[1,X], y=[1,Y]} sim(kf_{Ax}, kf_{By}) \quad (1)$$

That is, the maximum similarity between any two video key-frames from the both frame sequences determines the similarity of the frame sequences.

Figure 1A:
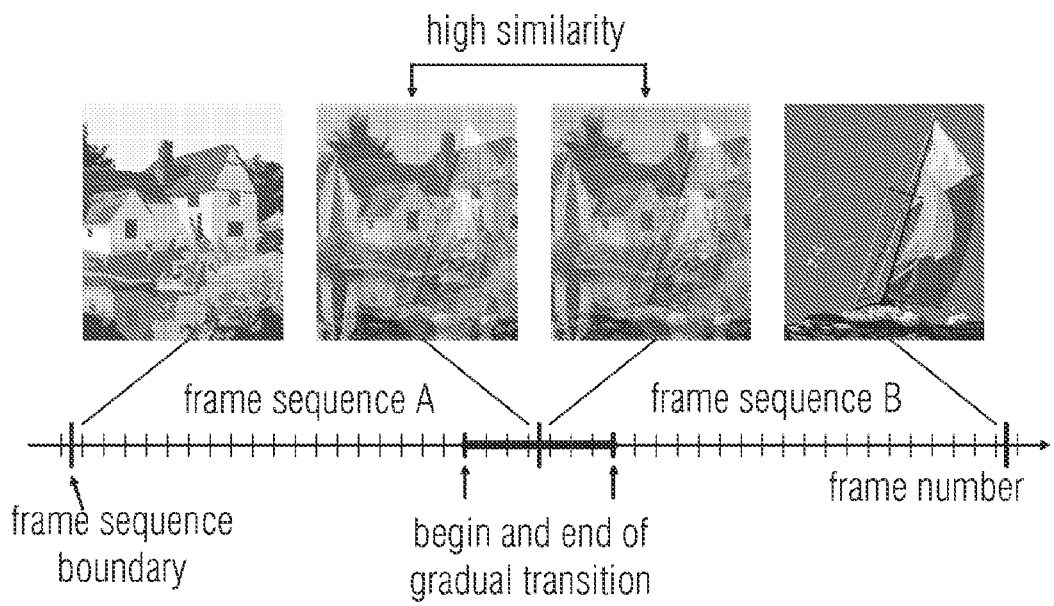
FIG. 1A is a frame choice with a gradual transition, known art.

For this, known methods for similarity analysis utilize exactly the first and the last frame in a frame sequence, since these frames best represent the changes in the frame content within a frame sequence. However, if frame sequence B directly follows frame sequence A, and if a gradual transition (FADE, DISSOLVE or WIPE) lies at the boundary between the both frame sequences considered, then the last frame of frame sequence A may be very similar to the first frame of frame sequence B, compare FIG. 1A. Accordingly, the known methods would rate the both frame sequences as very similar and, thus, associate them with the same scene. A scene boundary possibly present would not be detected.

Figure 1B:
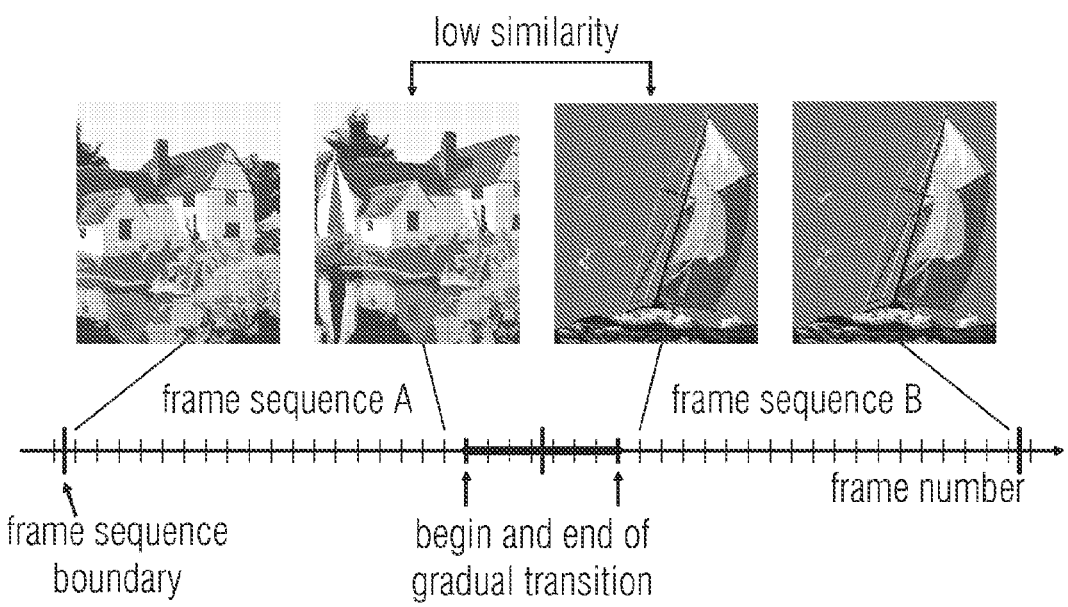
FIG. 1B is a frame choice outside of a gradual transition.

Thus, in the invention, basically only video frames outside of transitions between frame sequences are chosen. For this, knowledge of the type and length of a transition is needed. However, they may be detected with particular methods, as already set forth above. Then, video frames directly before and after the transition, that is, outside of the transition, may be utilized for the similarity analysis. Gradual transitions between frame sequences do no longer distort the similarity analysis (compare FIG. 1B). If no knowledge of the accurate length of a gradual transition is present, also values of experience may be deployed for this purpose. As a compromise, it may be postulated that the video frames to be chosen should lie a number x, e.g. x=5, of video frames from the frame sequence boundary.

By the special inventive choice of the best video key-frames for the similarity analysis, almost all known methods for detecting scene boundaries may be improved, since they rely on the similarity analysis of frame sequences.

Utilizing Gradual Transition Between Frame Sequences for Scene Separation

In the following, P(scb) denotes the probability for a scene boundary to lie on a frame sequence boundary of an arbitrary type. P(scb|sttype) denotes the conditional probability for a scene boundary to lie on a frame sequence boundary with a known transition, wherein the type of the transition sttype originates from the set {CUT, FADE, DISSOLVE, WIPE}. According to table 4 and the description below, the following equations result for the probabilities (P(scb)=8.65%):

$$P(scb) > P(scb|CUT) \quad (2)$$

$$P(scb) < P(scb|FADE) \quad (3)$$

$$P(scb) < P(scb|DISSOLVE) \quad (4)$$

$$P(scb) < P(scb|WIPE) \quad (5)$$

By this probability distribution it becomes clear that the respective type of transition in itself carries information on a possible scene boundary. This information is employed in the invention for an improved scene detection.

The attraction $stta_{t,sep}(k)$ is defined for the attraction effect of transitions between frame sequences. This function assigns an attraction value attr to each transition k between the frame sequence k and the frame sequence k+1 in dependence on its type. The index t stands for transition, the index sep for the separating effect of the transition. The following attraction values attr are defined:

$stta_{t,sep}(k) = attr_{CUT}$ if the transition k is of the CUT type, $stta_{t,sep}(k) = attr_{FADE}$ if the transition k is of the FADE type, $stta_{t,sep}(k) = attr_{DIS}$ if the transition k is of the DISSOLVE type, $stta_{t,sep}(k) = attr_{WIPE}$ if the transition k is of the WIPE type, and $stta_{t,sep}(k) = attr_{SUBSHOT}$ if the transition k is a transition between two subordinate frame sequences of the same superordinate frame sequence (subshot). (6)

Figure 2:
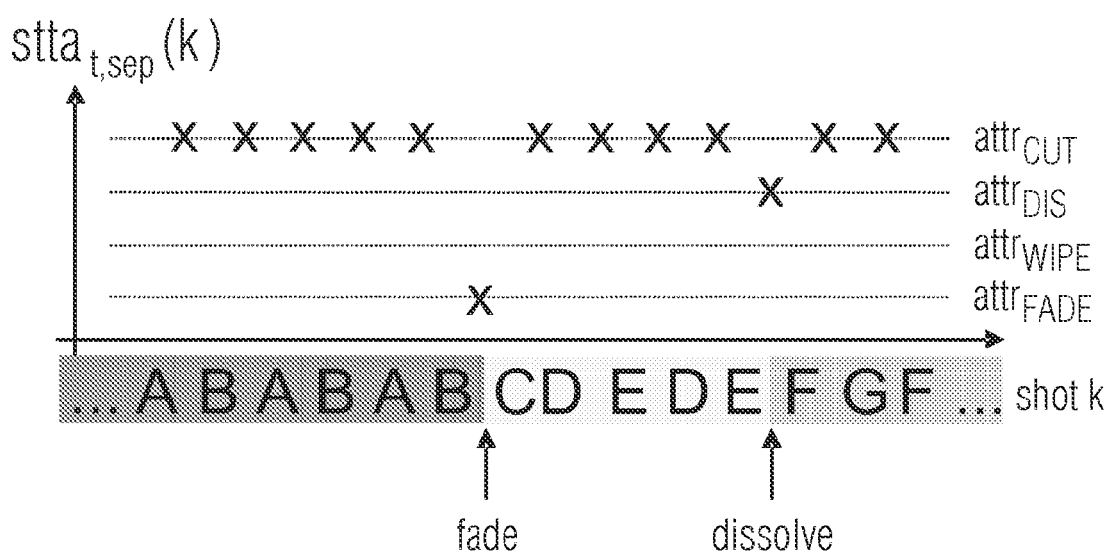
FIG. 2 is a diagram of the attraction of the transition k with taking the separating effect into account.

The attraction $stta_{t,sep}(k)$ indicates the attractive force each type of transition exerts on its direct environment. A high value holds the frame sequences together (no scene boundary), and a low value separates the frame sequences into individual scenes. FIG. 2 shows different values for the attraction $stta_{t,sep}(k)$ for a sequence of frame sequences with transitions in the form of CUTS, one FADE and one DISSOLVE, and the further corresponding parameters.

Figure 3A:
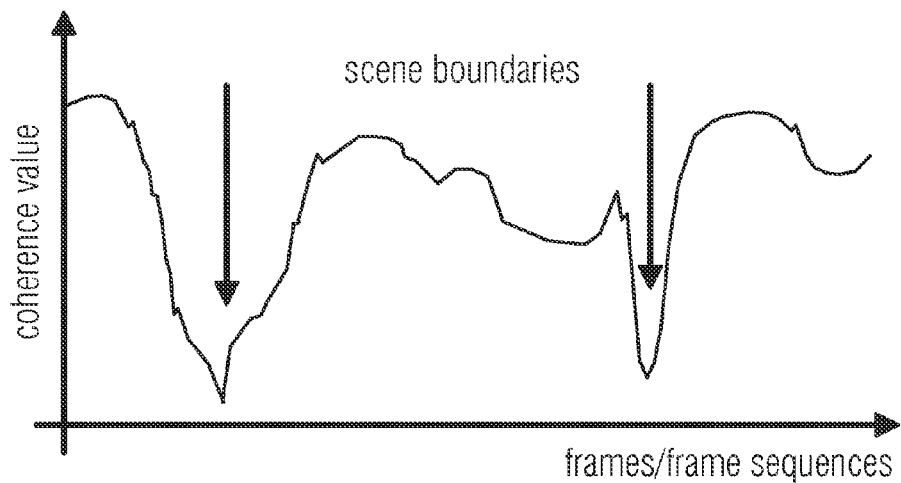
FIG. 3A is a diagram of the coherence-based scene segmentation, known art.

In the following, the integration into coherence-based methods for detecting scene boundaries will be shown. The integration includes replacing the coherence function coh(k) in the known methods (FIG. 3A shows a coherence function, minimum values indicate scene boundaries) with a modified version $coh_{mod}(k)$. The modification may be made according to the following formula:

$$coh_{mod}(k) = \alpha\, coh(k) + \beta\, stta_{t,sep}(k) \quad (7)$$

In this context, coh(k) is the coherence of frame sequences before the transition k to frame sequences after the transition k, as are calculated by methods known from the known art.

Here, α, β are weighting factors indicating how strong the influence of the separating effect of gradual transitions is in the scene detection. For example, they may be 0.5.

Figure 3B:
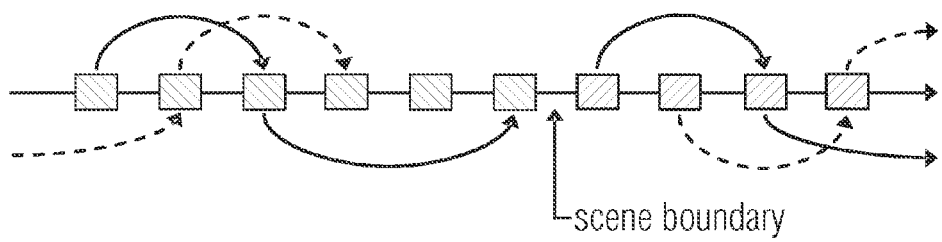
FIG. 3B is a diagram of the similarity-based scene segmentation ("overlapping links"), known art.
Figure 3C:
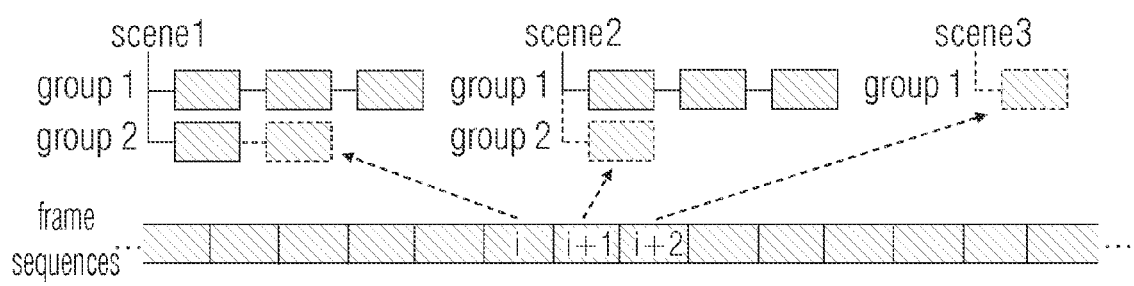
FIG. 3C is a diagram of the similarity-based scene segmentation ("time adaptive grouping", known art, FIG. 4 is a diagram of the attraction of the transition k with taking the separating and linking effect into account, FIG. 5A is a sequence of a frame sequence with establishing shots C, D, FIG. 5B is a coherence-based scene segmentation without any inventive measures, FIG. 5C is a diagram of the attraction of the transition k with taking the separating effect into account, FIG. 5D is a modified coherence-based scene segmentation according to FIG. 5C, FIG. 5E is a diagram of the attraction of the transition k with taking the separating and linking effect into account, FIG. 5F is a modified coherence-based segmentation according to FIG. 5E, FIG. 6A is a sequence of frame sequences linked by DISSOLVES, FIG. 6B is a coherence-based scene segmentation without any measures, FIG. 6C is a diagram of the attraction of the transition k with taking the separating effect into account, FIG. 6D is a modified coherence-based scene segmentation according to FIG. 6C, FIG. 6E is a diagram of the attraction of the transition k with taking the separating and linking effect into account and FIG. 6F is a modified coherence-based scene segmentation according to 6E and FIG. 7 is a flow chart of the decision on utilizing gradual transitions according to the film grammar, FIG. 8 is a flow chart of a method for determining a similarity between a first and a second frame sequence among frame sequences of a video, FIG. 9 is a schematic diagram of a part of a video, illustrating a probability for the choice of key-frames in the method of FIG. 8, FIG. 10 is a flow chart of a method for segmenting a video into scenes according to an embodiment, FIG. 11 is a flow chart of a method for segmenting a video into scenes according to a further embodiment, and FIG. 12 is a schematic diagram of a part of a video, illustrating a probability for the decision in FIG. 7 as to whether a sequence of gradual transitions is present or not.

Equally, an integration of the attraction $stta_{t,sep}(k)$ may occur in detection methods based on an analysis of the similarity between frame sequences (similarity-based scene segmentation; FIG. 3B shows an example of overlapping links, FIG. 3C shows an example of time-adaptive grouping). Here, the integration also consists in replacing the similarity function sim(i,j) in the known methods with the modified similarity function $sim_{mod}(i,j)$. The indices i and j designate the both frame sequences the similarity of which is determined. The following formulas hold true:

$$sim_{mod}(i,j) = \alpha\, sim(i,j) + \beta\, stta_{s,sep}(i,j) \quad (8)$$

with $$stta_{s,sep}(i,j) = \min_{k=i}^{j-1} stta_{t,sep}(k) \quad (9)$$

In the integration in a similarity-based scene segmentation, the attraction $stta_{s/sep}(i,j)$ between the frame sequences i and j takes on the minimum attraction value of all transitions k occurring between the frame sequences i and j (equation 9). This means that the transition between the frame sequences i and j with the strongest separating effect determines the modification of the similarity function (equation 8). The weighting factors α, β, in turn, have the same importance as in the coherence-based similarity analysis and may also take on the same values (α, β=0.5).

The determination of the concrete constant attraction values attr is made on a probability basis. These determine the influence of the different types of frame sequence transitions on scene segmentation. If the equations (7) and (8) are utilized, the probability for a declared scene boundary $scb_{decl}$ to lie at a predetermined transition is a function of $stta_{t,sep}(k)$. The original values of coherence and similarity are taken into account by the variable v in the following equation:

$$P(scb_{decl}|k) = f(stta_{t,sep}(k), v) \quad (10)$$

The smaller the value $stta_{t,sep}(k)$ for a predetermined frame sequence transition k, the larger the probability that this is a declared scene boundary $scb_{decl}$.

As may be seen from table 4, the probability of a scene boundary corresponds to the type of the transition (P(scb|sttype)). To integrate this knowledge into the invention, the following attraction values attr are defined for the attraction $stta_{sep}(k)$:

$$stta_{t,sep}(k) = attr_{CUT} = (P(scb|CUT)/P(scb|CUT), \quad (11)$$

if the transition k is of the CUT type, $$stta_{t,sep}(k) = attr_{FADE} = (P(scb|CUT)/P(scb|FADE), \quad (12)$$

if the transition k is of the FADE type, $$stta_{t,sep}(k) = attr_{DIS} = (P(scb|CUT)/P(scb|DISSOLVE), \quad (13)$$

if the transition k is of the DISSOLVE type, $$stta_{t,sep}(k) = attr_{WIPE} = (P(scb|CUT)/P(scb|WIPE), \quad (14)$$

if the transition k is of the type WIPE, and $$stta_{t,sep}(k) = attr_{SUBSHOT} = (P(scb|CUT)/P(scb|CUT)$$
$$= attr_{CUT}, \quad (14A)$$

if the transition k is a transition between two sub-shots within one shot.

With the test set for different program formats underlying the present discussion and a frame sequence division into shots, the following values result: $attr_{CUT}=1.0$; $attr_{FADE}=0.047$; $attr_{DIS}=0.120$; and $attr_{WIPE}=0.080$.

Utilizing Gradual Transitions for Suppressing Scene Boundaries

Figure 5A:
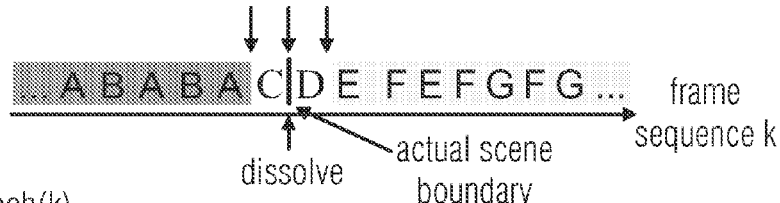
Figure 5A:
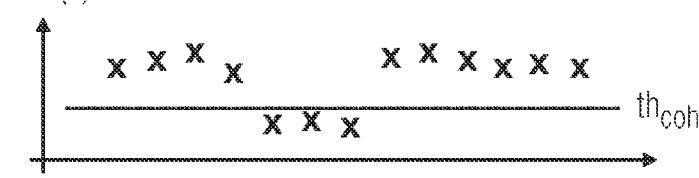
Figure 5A:
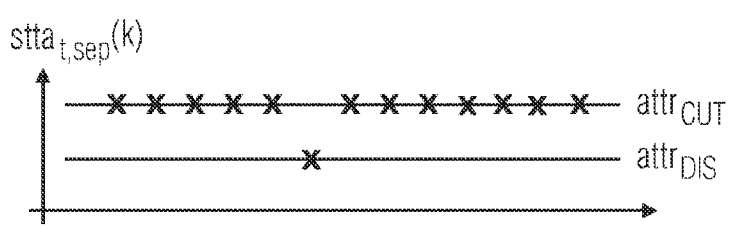
Figure 5A:
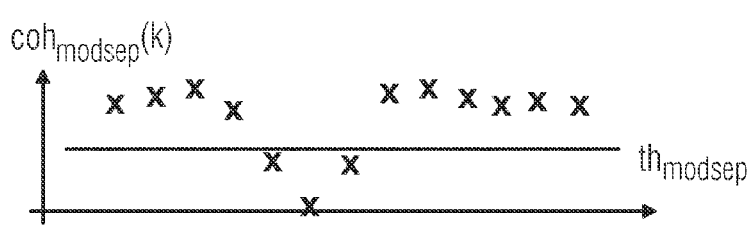
Figure 5A:
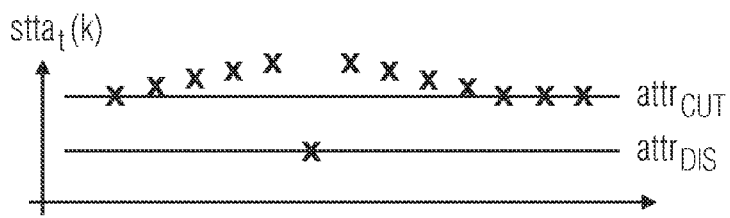
Figure 5A:
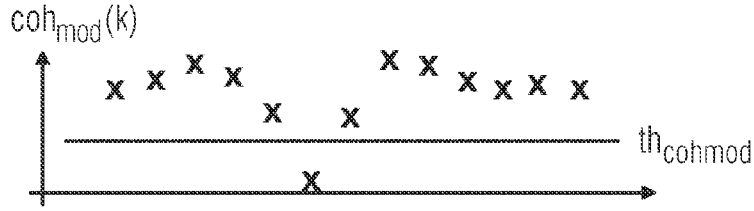

Gradual shot transitions (FADE, DISSOLVE, WIPE) are frequently employed for scene separation. Thus, as a rule, the presence of these gradual transitions may be interpreted as a cue to a scene boundary. At the same time, this means that it is very unlikely to find a further scene boundary in the environment of a gradual transition, since the scenes need a certain length to be recognized as a semantic unit by the viewer. Thus, gradual transitions have a linking effect on pairs of frame sequences which lie completely either before or after the gradual transition. This fact is not utilized in any of the methods known up to date for detecting scene boundaries. A typical example in which the known methods for scene detection frequently fail is represented by so-called "establishing shots" forming the introduction or an overview to a scene and, thus, belonging to the scene (e.g. the exterior view of a house for information on the setting of the scene, followed by visually completely different frame sequences of indoor shots in the house). FIG. 5A shows a corresponding example, frame sequences C and D basically show other frame contents than the frame sequences A and B, or E, F and G. There is only a real scene boundary between the frame sequences C and D at the transition of the DISSOLVE type.

Figure 6A:
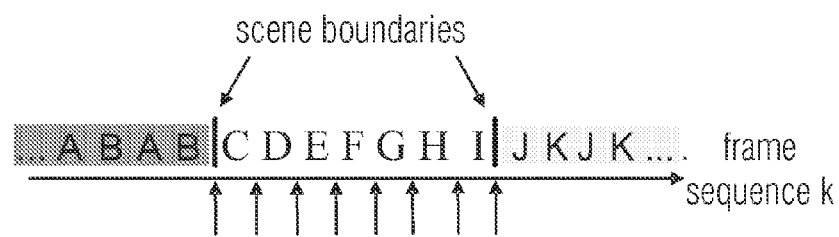

In another variant of cutting together frame sequences, gradual transitions are used to indicate the semantic association between visually different frame sequences. Here, too, the linking effect of gradual transitions may be advantageously utilized for scene detection. FIG. 6A shows a corresponding embodiment with a multitude of frame sequences with DISSOLVES as transitions.

By analogy and in addition to the previously explained function of attraction (with a separating effect), the linking effect of gradual transitions may now be defined as a function of the attraction with a merging effect $stta_{t,merge}(k)$:

$$stta_{t,merge}(k) = \sum_{i=1}^{r} f \frac{r+1-i}{r} (2 - stta_{t,sep}(k-i) - stta_{t,sep}(k+1)) \quad (15)$$

where f=comparison factor of the merging effect to the separating effect, e.g. 0.2 (for definition of f, see also FIG. 4 with $d_s$=value for the separating effect corresponding to the distance between $attr_{CUT}$ and $attr_{DIS}$, and $d_m$=increase in value by the linking effect) and r=range of the linking effect (number of transitions between frame sequences, e.g. 10).

In this context, it may be established that the linking effect linearly decreases with distance from the linking transition.

Utilizing Gradual Transitions with Separating and Linking Effect

Thus, the following results for the total attraction of transitions with separating and linking effect:

$$stta_t(k)=stta_{t,sep}(k)+stta_{t,merge}(k) \quad (16)$$

Figure 4:
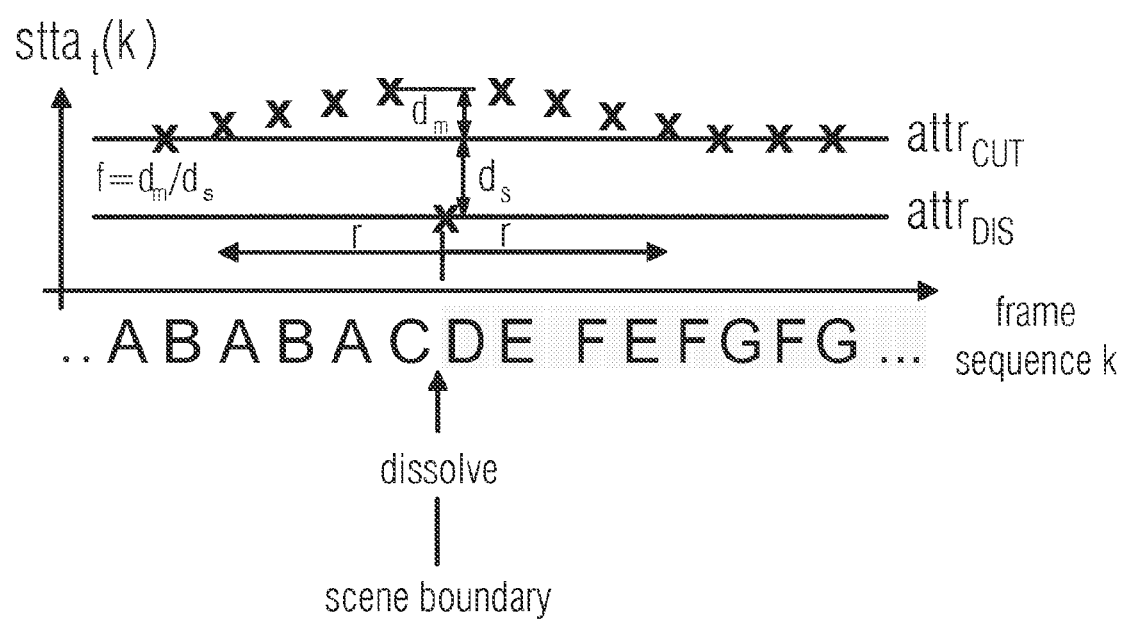

In FIG. 4, the total attraction stta t(k) for transition of the CUT type and a transition of the DISSOLVE type for f=0.5 and r=4 according to the equations (16) and (15) is illustrated. The value $stta_t(k)$ is low with gradual transitions (separating effect with attraction values $stta_t(k)$ below the line $attr_{CUT}=1$) and high with transitions withing the range r remote from the gradual transition (linking effect with attraction values $stta_t(k)$ above the line $attr_{CUT}=1$).

With the total attraction $stta_t(k)$ defined according to equation (16), $$coh_{mod}(k)=\alpha\, coh(k)+\beta\, stta_t(k) \quad (17)$$

results for the coherence-based scene segmentation.

For the similarity-based scene segmentation, $$sim_{mod}(i, j) = \alpha sim(i, j) + \beta stta_s(i, j) \quad (18)$$

results, with $$stta_s(i, j) = \min_{k=i}^{j-1} stta_t(k) \quad (19)$$

In the coherence-based scene segmentation, a gradual transition decreases the coherence value for the transition and increases the coherence value in the temporal neighborhood of the transition. For the similarity-based scene segmentation based directly on the similarity between frame sequences, the similarity value between frame sequences on different sides of the gradual transition decreases, while the similarity value between frame sequences on the same side of the gradual transition increases.

For sequences of frame sequences, FIGS. 5 and 6 show the detection of scene boundaries with taking the separating and linking effect of the transitions into account.

FIG. 5A shows a sequence of frame sequences with an "establishing shot" each at the end and the beginning of two scenes. Visually similar frame sequences are designated with the same character. The establishing shots C and D are visually dissimilar to the other frame sequences. A scene detection based on similarity cannot decide how many scene boundaries have to be inserted, and where: Before, between or after the frame sequences C and D. In FIG. 5B, all three coherence values are below the threshold value $th_{coh}$. Even if the separating effect of the gradual transition between C and D is taken into account, as is prescribed, FIGS. 5C and 5D show that it is still possible that additional—wrong—scene boundaries are inserted before and after the shots C and D by the scene detection. If both effects of the transitions—separating and linking—are taken into account, compare FIGS. 5E and 5F, the three coherence values significantly change for the frame sequence boundaries before, in between and after the frame sequences C and D. It is apparent that only the coherence value for the DISSOLVE type transition between the both frame sequences C and D is still below the threshold value $th_{cohmod}$ and leads to the setting of a scene boundary, which corresponds to the correct relations.

Figure 6B:
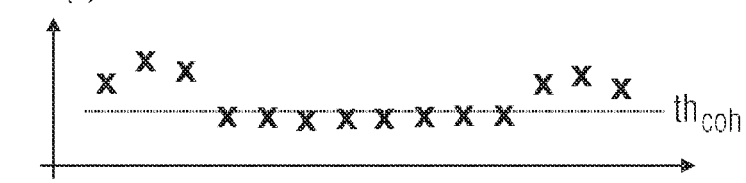
Figure 6C:
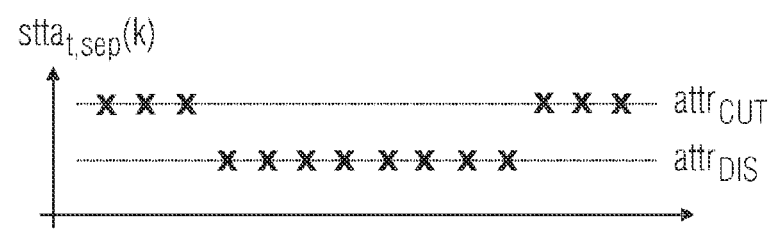
Figure 6D:
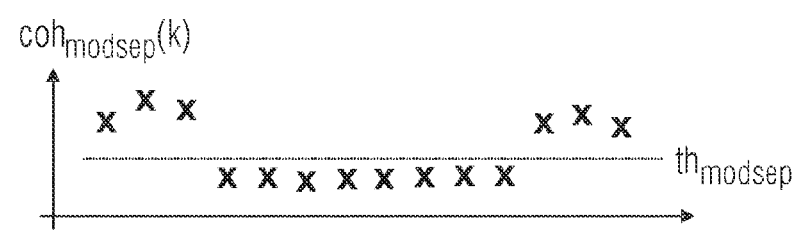
Figure 6E:
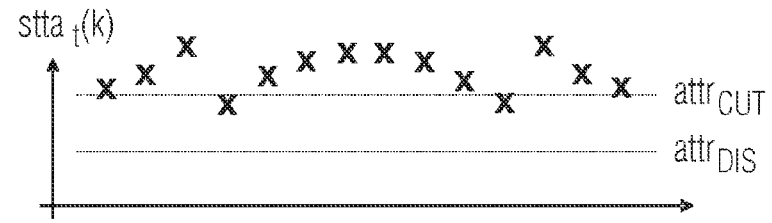
Figure 6F:
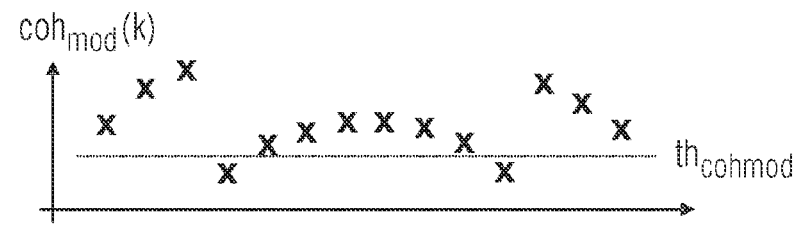

FIG. 6A shows a sequence of frame sequences with a linking effect of a series of successive DISSOLVES as transitions. Such series are employed for cutting together visually different, yet semantically coherent frame material. The coherence curve according to FIG. 6B shows that there is little coherence between the individual frame sequences, so that setting of scene boundaries between all frame sequences would occur. Taking the separating effect according to FIG. 6C into account does not lead to any satisfactory result either. No changed setting of scene boundaries results, compare FIG. 6D. In contrast, it may be seen in FIG. 6E that the linking effect of plural gradual transitions in a series may compensate for the separating effect. The coherence values for the inner gradual transitions increase above the threshold value $th_{cohmod}$ and do not lead to any setting of scene boundaries anymore, compare FIG. 6F. Thus, taking the linking effect of transitions into account may be deployed for avoiding errors when finding scene boundaries.

Decision Whether Gradual Transitions are Utilized According to Film Grammar

It has been already set forth above that transitions may be employed intentionally according to film grammar or contradictory or randomly and unintentionally. The second inventive measure (probability-based consideration and incorporation of the separating, or linking, effect of different types of transitions between frame sequences) may be applied only to such videos in which transitions are employed intentionally according to film grammar, since in the invention, a relation between film grammar and the transitions is presumed and is then evaluated on a probability basis to be able to find scene boundaries as free of errors as possible.

In the following, a general method (compare FIG. 7) will be explained with which it may be decided independently of the type of the video to be segmented whether gradual transitions are utilized to deliberately separate or hold together frame sequences or whether they have other reasons non based on grammar. In this context, the basic idea is based on a measurement of the correlation between the positions of the scene boundaries and those of the gradual transitions. It will be decided that the transitions are employed in the sense of film grammar if either a positive correlation (e.g. at least partial dependence of the scene boundaries on gradual transitions) or a sequence of gradual transitions is found in the video. In these cases, there is a relation between film grammar and the transitions, and the video may be optimally segmented into scenes by help of the inventive method. If this is not the case, at least the second inventive measure cannot be applied. A similarity analysis according to the first inventive measure also yields advantages in videos in which transitions are not employed with reference to film grammar, since here, a reference of the transitions to film grammar is not necessitated.

After the detection of the frame sequence boundaries with a known method and the detection with a scene detection method improved by the first inventive method, the correlation between the detected frame sequence and scene boundaries is to be measured. For this, the positions of the scene boundaries and the gradual transitions between the frame sequences FADE, DISSOLVE, WIPE are analyzed. They are positively correlated if the probability that a scene boundary corresponds to a given gradual transition (gradual) is larger than the probability that the scene boundary corresponds to an arbitrary transition. The following equation holds true:

$$P(scb|gradual) > P(scb) \quad (20)$$

Here, P(scb|gradual) refers to the conditional probability that a transition is a scene boundary if it is known that this transition is a gradual transition. This is sometimes also referred to as the probability for a scene boundary to correspond to a given gradual transition.

A negative correlation, or independence of the scene boundaries from the gradual transitions, is present if P(scb|gradual) is smaller than or equal to P(scb). Using simple algebra and the rules according to Bayes, equation (20) may be formed to:

$$P(scb|gradual)*P(gradual) > P(scb)*P(gradual) \quad (21)$$

$$P(gradual|scb)*P(scb) > P(scb)*P(gradual) \quad (22)$$

$$P(gradual|scb) > P(gradual) \quad (23)$$

Both equation (20) and equation (23) saying that there is also a positive correlation between the detected frame sequence and scene boundaries if the probability that a gradual transition corresponds to a given scene boundary is larger than the probability that there is any gradual transition at all may be determined by calculation, so that the above-mentioned decision may be made. If a positive correlation has been established, detection of the scene boundaries is rerun, now with a relation between transitions and film grammar.

Detection of the scene boundaries is also rerun if more than m gradual transitions are found in a scene with n transitions (in the test set, m=5, n=10 holds true). In this case, it may be also presumed that the transitions are employed according to film grammar. In a new run of the scene detection, a new set of scene boundaries is then correspondingly detected. In this context, however, most of the results from the first run may be utilized to minimize the computational expense. The results from the second run then undergo the method according to the invention. If no second run is needed, the results from the first run are directly further processed.

Test Results

The transitions between the frame sequences were automatically ascertainded on a pregiven test set with a corresponding method. The inventive measures for improving detection methods were evaluated on two versions of the test set. In the first version, all wrongly detected boundaries and transitions were manually corrected after the automatic detection of the frame sequence boundaries. In the second version, no manual correction was made. This serves for evaluating to which extent errors in detecting the frame sequence boundaries and transitions have an effect on the results in scene detection.

As an evaluation measure for the quality of the scene boundaries found, the parameters recall re and precision pr are defined:

$$re = \frac{c}{c+m} \text{ and } pr = \frac{c}{c+fp} \quad (20)$$

with c=correctly detected needed scene boundaries
co=correctly detected optional scene boundaries
m=wrongly detected scene boundaries
fp=not detected scene boundaries.

With a test set version with manually corrected frame sequence boundaries and transitions, the results according to table 5 were yielded, and with a uncorrected automated finding of the frame sequence boundaries and transitions, the results according to table 6. Three algorithms have been tested:

Basic: basic algorithm for a property-based similarity analysis (time-adaptive grouping) with a default of the both video key-frames from a frame sequence with a distance of 5 frames from the frame sequence boundary, M1: applying the basic algorithm with a concrete choice of video frames outside of transitions between the frame sequences (first inventive measure) and M1+2: applying the basic algorithm with a concrete choice of video key-frames outside of transitions between the frame sequences and additionally taking the separating and linking effect of transitions of different types into account (first and second inventive measure).

TABLE 5

|       | re    | pr    | c   | co | m  | fp |
|-------|-------|-------|-----|----|----|----|
| Basic | 65.9% | 71.1% | 135 | 41 | 70 | 55 |
| M1    | 72.2% | 71.8% | 148 | 39 | 57 | 58 |
| M1 + 2| 78.5% | 82.1% | 161 | 35 | 44 | 35 |

TABLE 6

|      | re    | pr    | c   | co | m  | fp |
|------|-------|-------|-----|----|----|----|
| Basic | 63.4% | 67.7% | 130 | 40 | 75 | 62 |
| M1   | 71.2% | 71.6% | 146 | 39 | 59 | 58 |
| M1 + 2 | 75.6% | 77.5% | 155 | 30 | 50 | 45 |

It is apparent that the measures formulated in the invention significantly reduce the number of wrongly and non-detected scene boundaries. Recall and precision have correspondingly increased.

The above embodiments allow an automated method for temporal segmentation of a video into scenes with uniting frame sequences by detecting frame sequence boundaries as scene boundaries, wherein different types of transition occur at the frame sequence boundaries and the frame sequence boundaries and transitions are known according to position, type and length, namely, with establishing the similarity between two respective frame sequences by choosing and comparing respective key-frames from each frame sequence, which temporally lie as far apart from each other as possible but outside of transitions, and/or with a film grammar- and probability-based taking into account of different types of transitions between frame sequences with respect to their separating and/or linking effect on the frame sequences surrounding the transitions, and a correspondingly weighted incorporation of the effects of the different types of transitions into the uniting of frame sequences into scenes.

Here, a choice of video key-frames additionally lying at least a number of x video frames before or after the respective frame sequence boundary may be provided.

Establishing the separating or linking effect for each transition k between frame sequences may be made by ascertaining a total attraction $stta_t(k)$ comprised of a separating attraction $stta_{t,sep}(k)$ and a linking attraction $stta_{t,merge}(k)$, namely according to $stta_t(k) = stta_{t,sep}(k) + stta_{t,merge}(k)$, wherein $stta_t(k)$ is added to the coherence $coh(k)$ in a coherence-based scene segmentation or the similarity $sim(i,j)$ in a similarity-based scene segmentation between two frame sequences i,j, wherein the total attraction $stta_t(k)$ is low for a separating effect of the transition k and is high for a linking effect. In this context, an addition of the total attraction $stta_t(k)$, weighted by the weighting factors $\alpha$, $\beta$, to the respective values may be used in a coherence-based scene segmentation according to $coh_{mod}(k) = \alpha\, coh(k) + \beta\, stta_t(k)$, or—in a similarity-based segmentation—according to $$sim_{mod}(i,j) = \alpha sim(i,j) + \beta stta_s(i,j),$$

with $$stta_s(i,j) = \min_{k=i}^{j-1} stta_t(k).$$

For the weighting factors, $\alpha$, $\beta=0.5$ may apply.

A determination of the separating attraction $stta_{t,sep}(k)$ may be performed especially by attraction values attr in dependence on the type of the transition, with $stta_{t,sep}(k) = attr_{CUT}$, if the transition k is of the CUT type, $stta_{t,sep}(k) = attr_{FADE}$ if the transition k is of the FADE type, $stta_{t,sep}(k) = attr_{DIS}$ if the transition k is of the DISSOLVE type, $stta_{t,sep}(k) = attr_{WIPE}$ if the transition k is of the WIPE type, and $stta_{t,sep}(k) = attr_{SUBSHOT}$ if the transition k is a transition between two subordinate frame sequences of the same superordinate frame sequence, wherein a CUT is an abrupt transition and a FADE, DISSOLVE or WIPE is a gradual transition. In this context, ascertaining the attraction values attr may be made on the basis of statistic evaluations on videos of different types with respect to the correspondence of scene boundaries and frame sequence boundaries in dependence on the occurring transitions, e.g. by ascertaining the attraction values attr in the form of quotients of the probability P that a scene boundary scb lies on a transition of type CUT to the probability that a scene boundary scb lies on another transition of a particular type, with $attr_{CUT} = (P(scb/CUT)/P(scb/CUT)$, $attr_{FADE} = (P(scb/CUT)/P(scb/FADE)$, $attr_{DIS} = (P(scb/CUT)/P(scb/DISSOLVE)$, $attr_{WIPE} = (P(scb/CUT)/P(scb/WIPE)$, $attr_{SUBSHOT} = (P(scb/CUT)/P(scb/CUT) = attr_{CUT}$. In this context, $attr_{CUT} = 1.0$; $attr_{FADE} = 0.047$; $attr_{DIS} = 0.120$, and $attr_{WIPE} = 0.080$ may be chosen.

A determination of the linking attraction $stta_{t,merge}(k)$ may be made according to $$stta_{t,merge}(k) = \sum_{i=1}^{r} f \frac{r+1-i}{r}(2 - stta_{t,sep}(k-i) - stta_{t,sep}(k+1)),$$

where f=comparison factor of the linking to the separating effect, r=range of the linking effect in the frame sequence, wherein the linking effect linearly decreases with distance from the linking transition. In this context, f=0.2 and r=10 or f=0.5 and r=4 may apply.

An examination of the content reference of the transitions between the frame sequences may be provided by a test whether a positive correlation between gradual transitions and scene boundaries and/or a sequence of gradual transitions is present between frame sequences, namely, with a positive correlation being present, for example, if the probability that a scene boundary corresponds to a given gradual transition is larger than the probability that the scene boundary corresponds to any arbitrary transition, or if the probability that a gradual transition corresponds to a given scene boundary is larger than the probability that a gradual transition is present.

The frame sequences may be formed in the form of shots or sub-shots, wherein sub-shots are sub-frame sequences of shots.

In the above, embodiments enabling improvements in scene detection have been described. In the following, further embodiments will be described which, largely, co-incide with the above embodiments but which, however, are described with reference to flow charts so that the individual steps performed may easily be understood.

Figure 8:
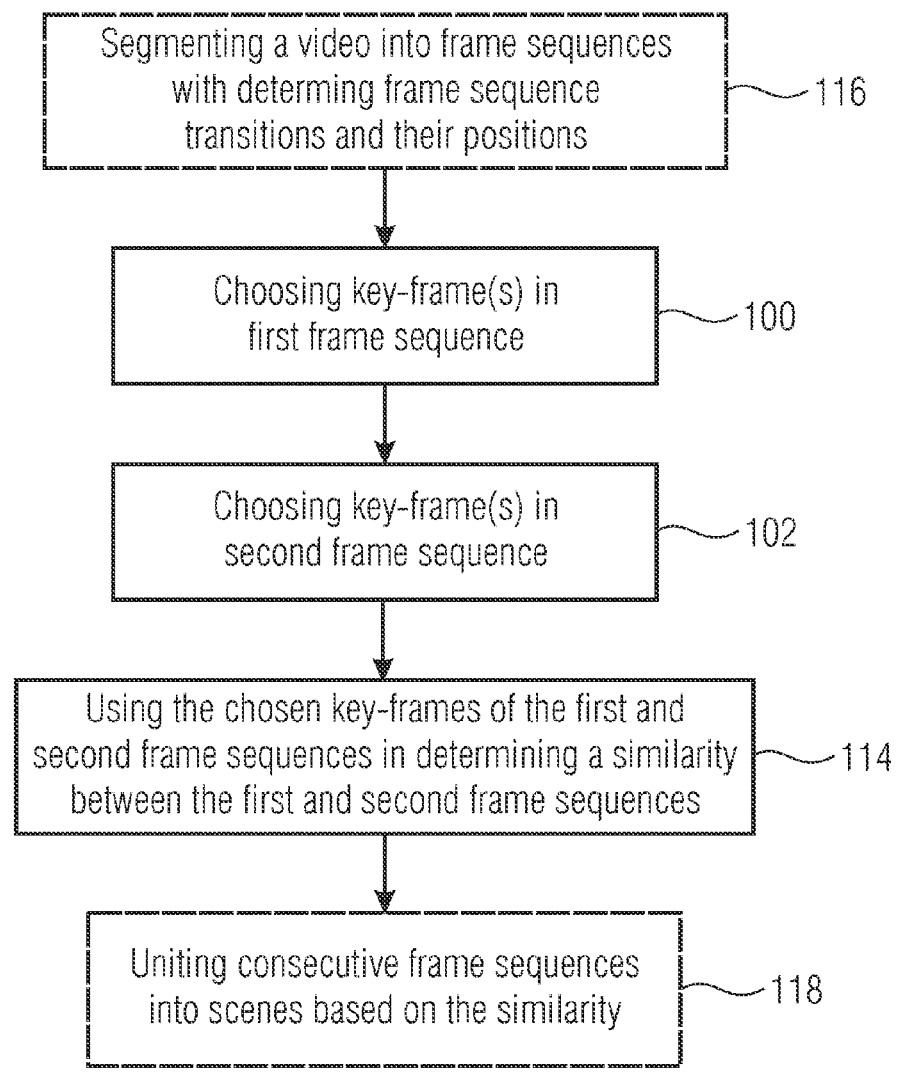
Figure 9:
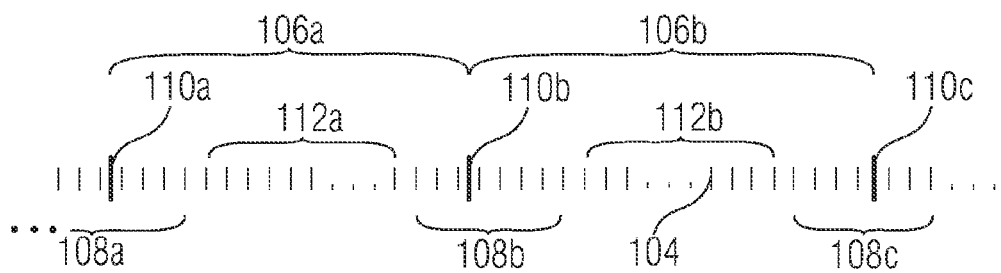

For example, FIG. 8 shows a method for determining a similarity between two frame sequences of a video. The method begins with choosing one or more key-frames in a first frame sequence in step 100, and choosing one or more key-frames in a second frame sequence in step 102. As it has already been outlined above, the frame sequences may be shots. Further, frame sequence transitions are defined at each frame sequence boundary of immediately adjacent frame sequences. In other words, the video consists of a sequence of consecutive frame sequences which do not overlap each other but abut each other at a frame sequence boundary. The frame sequence transition occurring at a respective frame sequence boundary may extend over zero frames, i.e., may be an abrupt transition, or may extend across a sequence of several consecutive frames at the frame sequence boarder in which case the frame sequence transition is a gradual transition. The choice in both steps 100 and step 102 is performed such that the chosen key-frames lie outside the frame sequence transitions. In other words, in steps 100 and 102, the key-frames are chosen among frames within the first and second frame sequences outside the frame sequence transitions. This is illustrated in FIG. 9 showing a portion of a video composed of a sequence of consecutive frames 104, the video being segmented into a sequence of consecutive frame sequences 106a and 106b (merely two are shown for illustration reasons). Further, FIG. 9 shows examples of possible frame sequence transitions 108a, 108b and 108c and possible extensions thereof respectively, at the frame sequence boundaries 110a, 110b and 110c. Exemplarily, merely gradual frame sequence transitions are shown. However, as indicated above, any of the transitions 108a to 108c could also be of length zero, i.e., be an abrupt transition. Thus, in the exemplary state shown in FIG. 9, the choice of a key-frame in step 100 and step 102, respectively, with respect to the frame sequences 106a and 106b shown in FIG. 9 would be performed merely among the frames 112a and 112b, respectively, outside the frame sequence transitions 108a to 108c.

Then, in step 114, the chosen key-frames of the first and second frame sequences are used in determining the similarity between the first and second frame sequences.

As becomes clear from the above, the method for determining the similarity between first and second frame sequences is based on the provision that the frame sequence transitions are known. Of course, it would be possible that the method includes a step of segmenting the video into the frame sequences with determining the frame sequence transitions and the extension thereof, respectively, at the frame sequence boundaries. This is illustratively shown in FIG. 8 at step 116.

Further, additionally or alternatively, the method of FIG. 8 may be used in segmenting the video into scenes. Accordingly, FIG. 8 shows an optional step 118 of uniting consecutive frame sequences into scenes based on the similarity determined in step 114.

As has already been described above, there are different possibilities for determining a similarity between a first and a second frame sequence when one or more key-frames are used within each of the frame sequences. For example, the determination in step 114 may be based on a similarity measure as described in publication VIII or publication IX, the content of which is incorporated herein by reference with regard to the similarity measure. To be more precise, the step 114 may involve the computation of brightness (luminance) or color histograms for the key-frames chosen in steps 100 and 102, respectively. Based on these histograms, a similarity value may be determined in step 114, for example, by using some distance measure measuring the distance between vectors representing the histograms. In general, the determination of the similarity between the first and the second frame sequence in step 114 may disregard pixel values of frames other than the key-frames chosen in steps 100 and 102, respectively. On the other hand, the determination of the similarity between the first and second frame sequences may be based on merely a part of the pixel values within the key-frames chosen in steps 100 and 102, respectively. For example, pixel values of pixels in the middle of the frames may be disregarded in order to account for the fact that there is a high chance that same pixels relate to the foreground rather than the background of the scenes with the latter one being more correlated to the scene than the foreground. Further, the step of determining the similarity in step 114 may involve a step of determining a sub-set of the pixel values of the pixels within the chosen key-frames which, at the end, contribute to the determination of the similarity between the first and second frame sequences with the sub-set being determined by, for example, some optimisation algorithm. Further, the similarity between the first and second frame sequences may be performed based on the luminance information of the key-frames only or may involve some chroma component information of these key-frames only, or alternatively, both information. Further, some correlation between the key-frames of the different frame sequences and/or some edge enhancing filtering of the key-frames could be performed in step 114 in order to determine the similarity between the first and second frame sequences. In general, the similarity determined in step 114 depends on the choice of steps 100 and 102, respectively, i.e., which key-frames have been chosen among the frames of the first and second frame sequences in steps 100 and 102.

As has also already been described above, in case more than one key-frame is chosen in one of the frame sequences, the similarity determined in step 114 may by equal to a maximum of the similarities of pairs of any of the key-frames of the first frame sequence and any of the key-frames of the second frame sequence. Choosing two or more frames per frame sequence has the advantage of enabling capturing more of the visual content than by using one key-frame only. Especially, for frame sequences with varying visual content this will lead to superior frame sequence similarity measures and, in case of step 118, an improved scene detection.

As already described above, the frame sequences may be shots and a segmentation in step 116 may involve a shot detection. In order to address the problem that automatic shot detection processes are not 100% reliable and gradual transitions might be missed or detected as cuts, more than one frame to be used for the similarity determination in step 114 could be chosen in steps 100 and 102 such that they are, among the frames within the respective frame sequence, temporarally as far apart as possible, outside of detected gradual shot transitions, and at least x frames apart from the respective frame sequence boundary. x may be equal to or greater than 5, for example. For completeness only, it is noted again that the uniting step 118 may be performed in accordance with any of known scene detection approaches such as video coherence/decision curve, overlapping links, time adaptive grouping, clustering or graph based approaches. All these approaches are based on shot similarity values, i.e., similarity values between two given shots. In time adaptive grouping, for example, shot similarity values are checked to decide whether the current shot can be merged into an existing group or scene. If the shot similarity values are too small and merging is not possible a new scene is declared.

Figure 10:
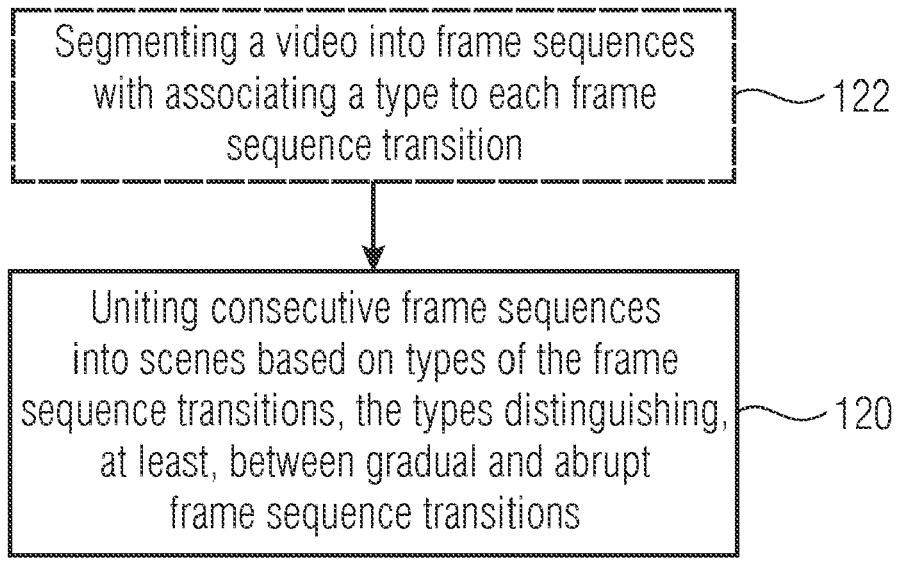

FIG. 10 shows a method for segmenting a video into scenes. As shown in FIG. 10, the method comprises a step 120 according to which consecutive frame sequences are united into scenes based on types of the frame sequence transitions, the types distinguishing, at least, between gradual and abrupt frame sequence transitions. Similar to FIG. 8, FIG. 10 assumes that the video to be segmented has already been segmented into the consecutive frame sequences. Further, in case of FIG. 10, it is assumed that the types of the frame sequence transitions are known. Similar to FIG. 8, the step of segmenting the video into frame sequences with associating a type to each frame sequence transition may, optionally, be part of the method itself as shown at 122. Compared to step 116, the segmentation in step 122 may be simplified in that the frame sequence transitions merely need to be classified into gradual frame sequence transitions on the one hand and abrupt frame sequence transitions on the other hand. The beginning and end positions of the frame sequence transitions need not to be known in case of FIG. 10.

The dependency of the uniting step 120 on the types of the frame sequence transitions may be such that the probability that a certain frame sequence transition represents a scene boundary is increased if the respective frame sequence transition is of the gradual type (compared to the case where respective frame sequence transition was of an abrupt type) and is decreased if the respective frame sequence transition has one or more frame sequence transitions in it's neighborhood that are of a gradual type, compared to the case if none of the neighboring frame sequence transitions in the neighbourhood was of a gradual type.

The first part of the just mentioned "such that" sub-clause represents the semantic use of gradual transitions as scene boundaries. This semantic use manifests itself, for example, in the uniting step 120 when using the above-mentioned association of attraction values to the different types of frame sequence transitions as shown in FIG. 2 or shown in equations (6). The latter part of the "such that" sub-clause relates to the scene boundary suppressing effect or anti-use of temporal clusters of gradual frame sequence transitions. This effect is, for example, reflected when using the above-mentioned formula (15).

Figure 11:
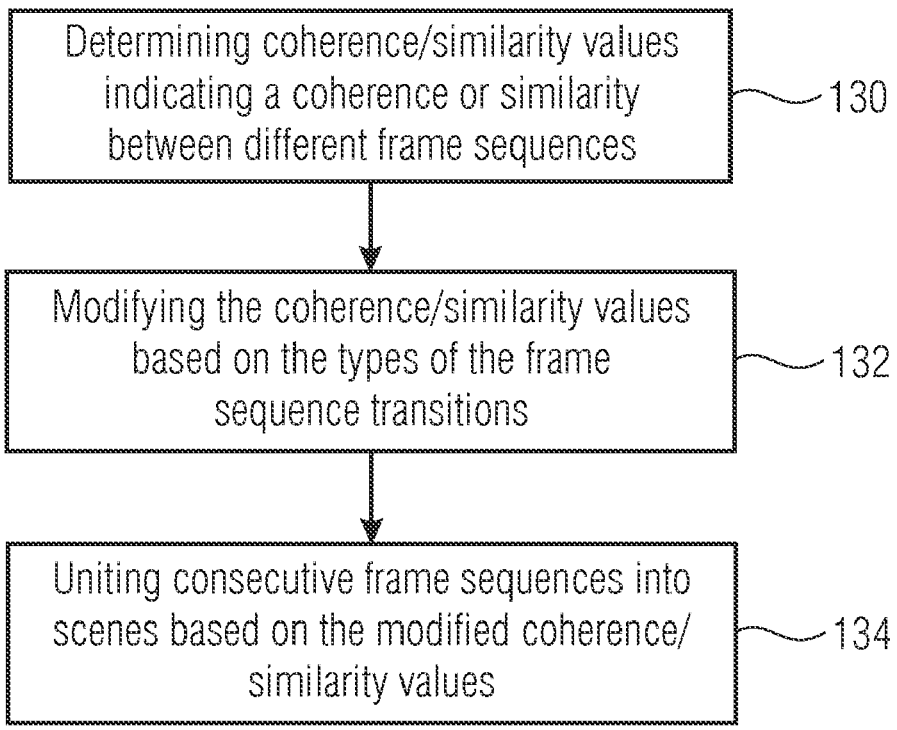

FIG. 11 shows an example for the step 120 of FIG. 10 in more detail. In particular, the method shown in FIG. 11 exploits the fact that most of the existing scene detection approaches use similarities between pairs of shots in order to unite consecutive frame sequences or shots into scenes. In accordance with the method of FIG. 11, coherence/similarity values used for measuring the similarity between different frame sequences are modified based on the type of the frame sequence transitions, and, especially, at least the type of that or those frame sequence transitions lying between the frame sequences under comparison.

In particular, in step 130, coherence/similarity values indicating a coherence or similarity between different frame sequences is determined. In step 132, these coherence/similarity values are modified based on the types of the frame sequence transitions. Then, in step 134, consecutive frame sequences are united into scenes based on the modified coherence/similarity values.

Although in FIG. 11, coherence and similarity values have been distinguished in accordance with the preceding description of the preceding embodiments, both values may be called similarity values because both values may be seen as a measure for the similarity between frame sequences. Similar to the description of step 114, the determination of the similarity values in step 130 may be based on a similarity measure measuring the distance between statistical values or distributions/histograms obtained from pixel values of the frame sequences between which the similarity is to be determined. Alternatively, the determination in step 130 may involve a convolution between frames of the different frame sequences.

The modification in step 132 may comprise an addition as it was the case in the preceding embodiments. Alternatively, the modification may comprise a subtraction or a multiplication or division or the like. In general, the modification 132 may be performed such that, after modification, the similarity value of two adjacent frame sequences is lower if the frame sequence transition(s) therebetween is of the gradual type, compared to the case where the frame sequence transition was of the abrupt type, and the similarity value is higher if neighboring frame sequence transitions are of the gradual type, compared to the case where none of the neighboring frame sequence transitions are of the gradual type.

The step of uniting 134 may involve the use of a threshold value in order to identify frame sequence transitions as scene boundaries. However, other possibilities also exist as already indicated above.

Figure 7:
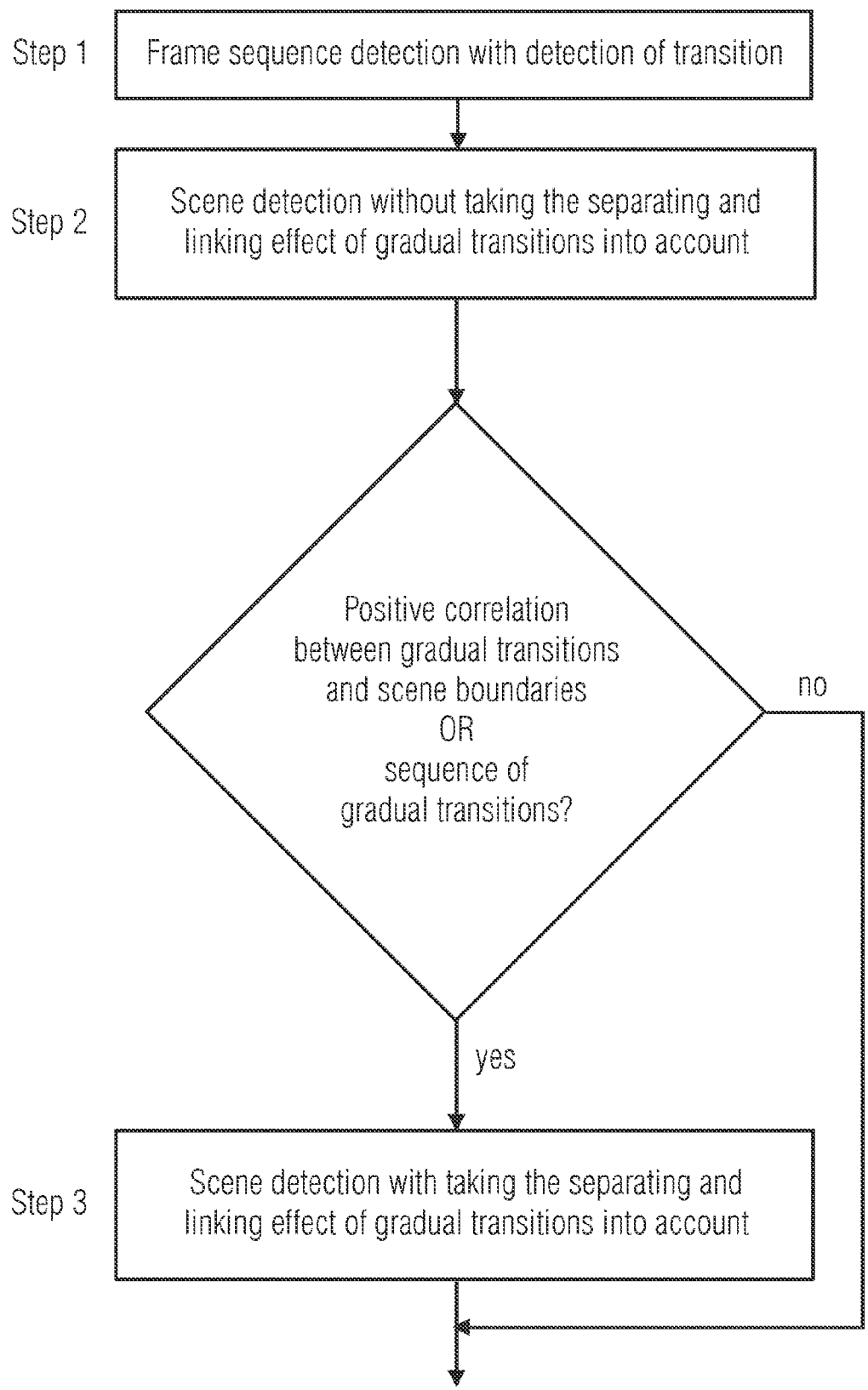

As it has already been described with respect to FIG. 7, the methods of FIGS. 10 and 11, respectively, may be activated depending on a test on the video sequence detecting whether or not gradual shot transitions have been used as film grammar cues in the video sequence or not. The existence of a positive correlation between gradual shot transitions on the one hand and scene boundaries on the other hand is determined based on an initial scene detection (step 2) which may be performed in accordance with FIG. 8. The other triggering event upon the detection of which the re-run of the scene detection is performed in step 3, is the existence of a temporal cluster of gradual transitions. Thus, scene detection is re-run in step 3 if one of the following applies:

1. Positive correlation between gradual shot transitions and scene boundaries is detected, or
2. More than m gradual shot transitions occur within a sequence of n consecutive shot transitions wherein, for example, n/3<m<2n/3 and, for example, n being between 5 and 15.

Figure 12:
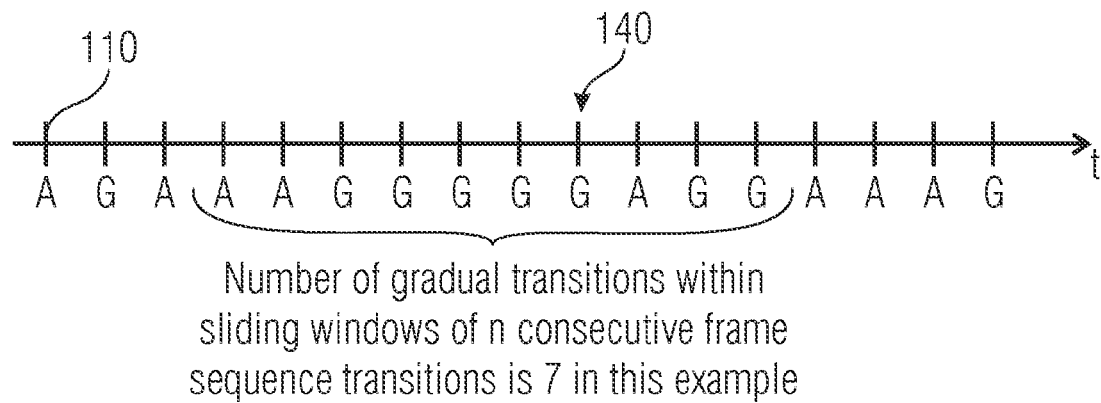

For the latter triggering event, the outcome of the shot detection in step 1 is used in order to analyse the sequence of shot transitions and to detect as to whether any sub-sequence of n consecutive frame sequence transitions comprise more than m gradual transitions. FIG. 12 illustrates the procedure with the frame sequence boundary being illustrated with short lines 110, "G" denoting gradual transitions and "A" denoting abrupt transitions and n being exemplarily equal to 10. FIG. 12 shows exemplarily a temporal cluster of gradual transitions triggering the execution of step 3.

Finally, it is noted that the methods presented above may be embodied in hardware, software or programmable hardware. Similarly, the individual steps shown in FIGS. 7, 8, 10 and 11 may be embodied in respective portions of a computer program such as, for example, in form of respective sub-routines or the like, or these individual steps may be embodied by distinct portions of a hardware such as, for example, an integrated circuit or the like. In other words, although the embodiments of FIGS. 7, 8, 10 and 11 have been described based on process steps, it is pointed out that the corresponding figures represent of course at the same time also the construction of a corresponding device for performing the respective method in that the individual blocks represent for example the individual means that perform the corresponding functions. These means can for example be components of a computer program or be components of an ASIC or another hardware or also components of a FPGA or another programmable logic component.

In particular, attention is drawn to the fact that depending on the circumstances the scheme in accordance with the invention can also be implemented in software. The implementation can occur on a digital storage medium, in particular a disk or a CD with electronically readable control signals, which can cooperate with a programmable computer system so that the corresponding method is performed. Generally, the invention thus also consists of a computer program product with a program code stored on a machine-readable carrier for performing the method in accordance with the invention when the computer program product is executed on a computer. In other words, the invention can thus be implemented as a computer program with a program code for performing the method when the computer program is executed on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A method for temporal segmentation of a video into scenes by uniting frame sequences by detecting frame sequence boundaries as scene boundaries, wherein different types of transitions occur at the frame sequence boundaries, and the frame sequence boundaries and transitions are known according to position and type, the method comprising the steps of:
performing film grammar-based and probability-based determinations of the different types of transitions occurring at the frame sequence boundaries with respect to a separating and/or merging effect on the frame sequences surrounding the transitions and correspondingly weighted incorporation of the effects of the different types of transitions into the uniting of the frame sequences into scenes based on the determinations by:
establishing the separating and/or merging effect for each transition k between the frame sequences including: ascertaining a total attraction $stta_t(k)$ comprised of a separating attraction $stta_{t,sep}(k)$ and a merging attraction $stta_{t,merge}(k)$:

$stta_t(k) = stta_{t,sep}(k) + stta_{t,merge}(k)$; and adding $stta_t(k)$ to a coherence $coh(k)$ in a coherence-based scene segmentation or similarity $sim(i,j)$ in a similarity-based scene segmentation between two frame sequences i,j wherein the total attraction $stta_t(k)$ is low for a separating effect of the transition k and is high for a merging effect.

2. The method according to claim 1, wherein an addition, weighted by weighting factors $\alpha$, $\beta$, of the total attraction $stta_t(k)$ to the corresponding values is performed in a coherence-based scene segmentation:

$coh_{mod}(k) = \alpha\, coh(k) + \beta\, stta_t(k)$ or in a similarity-based scene segmentation:

$sim_{mod}(i, j) = \alpha sim(i, j) + \beta stta_s(i, j)$ with $stta_s(i, j) = \min_{k=i}^{j-1} stta_t(k).$ 3. The method according to claim 1, wherein a determination of the separating attraction $stta_{t,sep}(k)$ occurs by attraction values attr in dependence on the type of the transition, namely according to:

$stta_{t,sep}(k) = attr_{CUT}$ if the transition k is of the CUT type, $stta_{t,sep}(k) = attr_{FADE}$ if the transition k is of the FADE type, $stta_{t,sep}(k) = attr_{DIS}$ if the transition k is of the DISSOLVE type, $stta_{t,sep}(k) = attr_{WIPE}$ if the transition k is of the WIPE type, and $stta_{t,sep}(k) = attr_{SUBSHOT}$ if the transition k is a transition between two subordinate frame sequences of the same superordinate frame sequence, wherein a CUT is an abrupt transition and a FADE, DISSOLVE or WIPE is a gradual transition.

4. The method according to claim 1, wherein a determination of the merging attraction $stta_{t,merge}(k)$ occurs according to:

$$stta_{t,merge}(k) = \sum_{i=1}^{r} f \frac{r+1-i}{r}(2 - stta_{t,sep}(k-i) - stta_{t,sep}(k+1))$$

where
f = comparison factor of the merging to the separating effect
r = range of the merging effect in the frame sequence,
wherein the merging effect linearly decreases with distance from the merging transition.

5. A method for temporal segmentation of a video into scenes by uniting frame sequences by detecting frame sequence boundaries as scene boundaries, wherein different types of transitions occur at the frame sequence boundaries, and the frame sequence boundaries and transitions are known according to position and type, the method comprising the steps of:
performing film grammar-based and probability-based determinations of the different types of transitions occurring at the frame sequence boundaries with respect to a separating and/or merging effect on the frame sequences surrounding the transitions and correspondingly weighted incorporation of the effects of the different types of transitions into the uniting of the frame sequences into scenes based on the determinations; and
examining a content reference of the transitions between the frame sequences by testing whether a positive correlation between gradual transitions and scene boundaries and/or a sequence of gradual transitions between frame sequences is present; wherein
the examination yields the presence of a positive correlation if the probability that a scene boundary corresponds to a given gradual transition is larger than the probability that the scene boundary corresponds to an arbitrary transition, or if the probability that a gradual transition corresponds to a given scene boundary is larger than the probability that a gradual transition is present.

6. A method for temporal segmentation of a video into scenes by uniting frame sequences by detecting frame sequence boundaries as scene boundaries, wherein different types of transitions occur at the frame sequence boundaries, and the frame sequence boundaries and transitions are known according to position and type, the method comprising:
performing film grammar-based and probability-based determinations of the different types of transitions occurring at the frame sequence boundaries with respect to a separating and/or merging effect on the frame sequences surrounding the transitions and correspondingly weighted incorporation of the effects of the different types of transitions into the uniting of the frame sequences into scenes based on the determinations; and
wherein the step of performing film grammar-based and probability-based determinations of the different types of transitions between frame sequences with respect to the separating and/or merging effect on the frame sequences surrounding the transitions and correspondingly weighted incorporation of the effects of the different types of transitions into the uniting of the frame sequences into scenes comprises:
modifying one of a coherence function $coh(k)$ representing a coherence of the frame sequences before the transition k to the frame sequences after the transition k and a similarity function $sim(i,j)$ representing a similarity between two frame sequences i and j, in dependence on the type of the transition k, or the type of the transition, or the transitions, between the frame sequences i and j; and performing a scene segmentation on the basis of the one of the modified coherence function and modified similarity function.

7. The method according to claim 6, wherein the modifying of one of a coherence function coh(k) representing a coherence of frame sequences before the transition k to frame sequences after the transition k or a similarity function sim(i, j) representing a similarity between two frame sequences i and j, in dependence on the type of the transition k, or the type of the transition, or the transitions, between the frame sequences i and j, comprises:

assigning an attraction value to each transition k' between a frame sequence k' and a frame sequence k'+1 in dependence on the type of the respective transition to acquire a function $stta_{t,sep}(k')$; and performing an addition of $stta_{t,sep}(k')$ to coh(k'), or of $$stta_{s,sep}(i,j) = \min_{k=i}^{j-1} stta_{t,sep}(k') \text{ to } sim(i,j).$$

8. The method according to claim 7, wherein the modifying of one of a coherence function coh(k) representing a coherence of frame sequences before the transition k to frame sequences after the transition k or a similarity function sim(i, j) representing a similarity between two frame sequences i and j, in dependence on the type of the transition k, or the type of the transition, or the transitions, between the frame sequences i and j, further comprises:

assigning a merging effect to each transition k' between a frame sequence k' and a frame sequence k'+1 in dependence on the type of the respective transition to acquire a function $stta_{t,merge}(k')$, namely according to $$stta_{t,merge}(k') = \sum_{i=1}^{r} f\frac{r+1-i}{r}(2 - stta_{t,sep}(k'-i) - stta_{t,sep}(k'+1)),$$

where r indicates a number of transitions and f represents a comparison factor; and performing an addition of $stta_{t,merge}(k)$ to coh(k), or of $$stta_{s,merge}(i,j) = \min_{k=i}^{j-1} stta_{t,merge}(k) \text{ to } sim(i,j).$$

9. A method of segmenting a video into scenes, comprising:

uniting consecutive frame sequences of the video into scenes depending on types of frame sequence transitions at frame sequence boundaries between the frame sequences, the types distinguishing, at least, between gradual and abrupt frame sequence transitions;

wherein the step of uniting of consecutive frame sequences into scenes comprises the steps of:

determining similarity values indicating a similarity between different frame sequences of the consecutive frame sequences;

modifying the similarity values based on types of the frame sequence transitions, the types distinguishing, at least, between gradual and abrupt frame sequence transitions;

uniting consecutive frame sequences into scenes based on the modified similarity values;

the method further comprises a step of examining a content reference of the transitions between the frame sequences by testing whether a positive correlation between gradual transitions and scene boundaries and/or a sequence of gradual transitions between frame sequences is present; and wherein the examination yields the presence of a positive correlation if the probability that a scene boundary corresponds to a given gradual transition is larger than the probability that the scene boundary corresponds to an arbitrary transition, or if the probability that a gradual transition corresponds to a given scene boundary is larger than the probability that a gradual transition is present.

10. A method of segmenting a video into scenes, comprising:

performing an initial scene detection by uniting consecutive frame sequences of the video into scenes;

determining whether a positive correlation exists between the occurrence of gradual frame sequence transitions and scene boundaries between the scenes of the initial scene detection; and if a positive correlation exists between the occurrence of gradual frame sequence transitions and scene boundaries between the scenes of the initial scene detection, performing a further scene detection by uniting consecutive frame sequences into scenes depending on the respective frame sequence transitions being a gradual frame sequence transition or not, and replacing a result of the initial scene detection by a result of the further scene detection, and if no positive correlation exists between the occurrence of gradual frame sequence transitions and scene boundaries between the scenes of the initial scene detection, maintaining the result of the initial scene detection and skipping the performance of the further scene detection, wherein the performance of the initial scene detection does not take any frame sequence transition type into account; and wherein the determination yields the presence of a positive correlation if the probability that a scene boundary corresponds to a given gradual transition is larger than the probability that the scene boundary corresponds to an arbitrary transition, or if the probability that a gradual transition corresponds to a given scene boundary is larger than the probability that a gradual transition is present.

11. The method according to claim 9, wherein the step of determining comprises determining as similarity values either a coherence function coh(k) representing a coherence of image sequences prior to a frame sequence transition k with image sequences after the frame sequence transition k and indicates scene boundaries by using minimum coherence values, or a similarity function sim(i,j) representing a similarity between two image sequences i and j, a high level of similarity in relation to a predefined threshold value indicating that the image sequences i and j belong to a shared scene, the step of modifying comprises associating, with each frame sequence transition k, an attraction value in dependence on the type of the respective frame sequence transition so as to obtain a function $stta_t(k)$, and performing an addition of $stta_t(k)$ to $coh(k)$ or of $$stta_s(i,j) = \min_{k=i}^{j-1} stta_t(k) \text{ to } sim(i,j),$$

with $stta_t(k)$ including a separating attraction $stta_{t,sep}(k)$ and a connecting attraction $stta_{t,merge}(k)$ in accordance with $stta_t(k) = stta_{t,sep}(k) + stta_{t,merge}(k)$, $stta_t(k)$ being low for a separating effect of the frame sequence transition k and being high for a connecting effect, the separating attraction $stta_{t,sep}(k)$ being smaller for gradual frame sequence transitions than for abrupt frame sequence transitions, and $stta_{t,merge}(k)$ being calculated from $stta_{t,sep}(k)$ such that a gradual frame sequence transition k reduces the coherence value $coh(k)$ for the frame sequence transition k and increases the coherence values in the temporal neighborhood of the frame sequence transition, or that the similarity value $sim(i,j)$ between image sequences i,j on different sides of the gradual frame sequence transition is reduced by $stta_{t,merge}(k)$, whereas the similarity value between bit sequences i,j on the same side of the gradual frame sequence transition k is increased; and the step of uniting consecutive frame sequences is performed on the basis of a modified coherence function or a modified similarity function.

12. The method according to claim 11, wherein said step of modifying is performed such that $$stta_{t,merge}(k) = \sum_{i=1}^{r} f \frac{r+1-i}{r}(2 - stta_{t,sep}(k-i) - stta_{t,sep}(k+i)),$$

wherein r indicates a number of frame sequence transitions, and f represents a comparative factor.

13. The method according to claim 11, wherein said step of modifying is performed while performing an addition, weighted by weighting factors $\alpha$, $\beta$, of the overall attraction $stta_t(k)$ to the corresponding values with coherence-based scene segmentation:

$$coh_{mod}(k) = \alpha coh(k) + \beta stta_t(k)$$

or
similarity-based scene segmentation:

$$sim_{mod}(i,j) = \alpha sim(i,j) + \beta stta_s(i,j) \text{ with } stta_s(i,j) = \min_{k=i}^{j-1} stta_t(k),$$

wherein $\alpha$ and $\beta$ flare predetermined weighting factors.

14. An apparatus for temporal segmentation of a video into scenes by uniting frame sequences by detecting frame sequence boundaries as scene boundaries, wherein different types of transitions occur at the frame sequence boundaries, and the frame sequence boundaries and transitions are known according to position and type, the apparatus comprising a hardware-implementation and being configured to:

perform film grammar-based and probability-based determinations to determine the different types of transitions occurring at the frame sequence boundaries with respect to a separating and/or merging effect on the frame sequences surrounding the transitions and provide correspondingly weighted incorporation of the effects of the different types of transitions into the uniting of the frame sequences into scenes based on the film grammar-based and probability-based determinations by:

establishing the separating and/or merging effect for each transition k between the frame sequences by ascertaining a total attraction $stta_t(k)$ comprised of a separating attraction $stta_{t,sep}(k)$ and a merging attraction $stta_{t,merge}(k)$:

$$stta_t(k) = stta_{t,sep}(k) + stta_{t,merge}(k);$$

and
adding $stta_t(k)$ to the coherence $coh(k)$ in a coherence-based scene segmentation or similarity $sim(i,j)$ in a similarity-based scene segmentation between two frame sequences i,j, wherein the total attraction $stta_t(k)$ is low for a separating effect of the transition k and is high for a merging effect.

15. A non-transitory computer readable digital storage medium having stored thereon a computer program having a program code for performing, when running on a computer, a method for temporal segmentation of a video into scenes by uniting frame sequences by detecting frame sequence boundaries as scene boundaries, wherein different types of transitions occur at the frame sequence boundaries, and the frame sequence boundaries and transitions are known according to position and type, the method comprising the steps of:

performing film grammar-based and probability-based determinations of the different types of transitions occurring at the frame sequence boundaries with respect to a separating and/or merging effect on the frame sequences surrounding the transitions and correspondingly weighted incorporation of the effects of the different types of transitions into the uniting of the frame sequences into scenes based on the film grammar-based and probability-based determinations by:

establishing the separating and/or merging effect for each transition k between the frame sequences including ascertaining a total attraction $stta_t(k)$ comprised of a separating attraction $stta_{t,sep}(k)$ and a merging attraction $stta_{t,merge}(k)$:

$$stta_t(k) = stta_{t,sep}(k) + stta_{t,merge}(k);$$

and
adding $stta_t(k)$ to a coherence $coh(k)$ in a coherence-based scene segmentation or similarity $sim(i,j)$ in a similarity-based scene segmentation between two frame sequences i,j, wherein the total attraction $stta_t(k)$ is low for a separating effect of the transition k and is high for a merging effect.

16. An apparatus for temporal segmentation of a video into scenes by uniting frame sequences by detecting frame sequence boundaries as scene boundaries, wherein different types of transitions occur at the frame sequence boundaries, and the frame sequence boundaries and transitions are known according to position and type, the apparatus comprising a hardware-implementation and being configured to:

perform film grammar-based and probability-based determinations to determine the different types of transitions occurring at the frame sequence boundaries with respect to a separating and/or merging effect on the frame sequences surrounding the transitions and provide correspondingly weighted incorporation of the effects of the different types of transitions into the uniting of the frame sequences into scenes based on the film grammar-based and probability-based determinations; and examine a content reference of the transitions between the frame sequences by testing whether a positive correlation between gradual transitions and scene boundaries and/or a sequence of gradual transitions between the frame sequences is present; wherein the examination yields the presence of a positive correlation if the probability that a scene boundary corresponds to a given gradual transition is larger than the probability that the scene boundary corresponds to an arbitrary transition, or if the probability that a gradual transition corresponds to a given scene boundary is larger than the probability that a gradual transition is present.

17. A non-transitory computer readable digital storage medium having stored thereon a computer program having a program code for performing, when running on a computer, a method for temporal segmentation of a video into scenes by uniting frame sequences by detecting frame sequence boundaries as scene boundaries, wherein different types of transitions occur at the frame sequence boundaries, and the frame sequence boundaries and transitions are known according to position and type, the method comprising the steps of:
performing film grammar-based and probability-based determinations of the different types of transitions occurring at the frame sequence boundaries with respect to a separating and/or merging effect on the frame sequences surrounding the transitions and correspondingly weighted incorporation of the effects of the different types of transitions into the uniting of the frame sequences into scenes based on the film grammar-based and probability-based determinations; and
examining a content reference of the transitions between the frame sequences by testing whether a positive correlation between gradual transitions and scene boundaries and/or a sequence of gradual transitions between frame sequences is present; wherein
the examination yields the presence of a positive correlation if the probability that a scene boundary corresponds to a given gradual transition is larger than the probability that the scene boundary corresponds to an arbitrary transition, or if the probability that a gradual transition corresponds to a given scene boundary is larger than the probability that a gradual transition is present.

18. A method of segmenting a video into scenes, comprising:
uniting consecutive frame sequences of the video into scenes depending on types of frame sequence transitions at frame sequence boundaries between the frame sequences, the types distinguishing, at least, between gradual and abrupt frame sequence transitions, wherein the step of uniting consecutive frame sequences into scenes comprises:
determining similarity values indicating a similarity between different frame sequences of the consecutive frame sequences;
modifying each similarity value based on a type of a frame sequence transition between the different frame sequences of the consecutive frame sequences, the similarity between which is indicated by the respective similarity value, the types distinguishing, at least, between gradual and abrupt frame sequence transitions, the modification involving adding a value $stta_{t,sep}$ to the respective similarity value, the value $stta_{t,sep}$ being dependent on the type of the frame sequence transition between the different frame sequences of the consecutive frame sequences, the similarity between which is indicated by the respective similarity value in a manner equal for all similarity values, and in a manner according to which the value $stta_{t,sep}$ is different for gradual and abrupt frame sequence transitions; and
uniting consecutive frame sequences into scenes based on the modified similarity values; wherein
a determination of the separating attraction $stta_{t,sep}(k)$ occurs by attraction values attr in dependence on the type of the transition, namely according to:

$stta_{t,sep}(k)=attr_{CUT}$ if the transition k is of the CUT type, $stta_{t,sep}(k)=attr_{FADE}$ if the transition k is of the FADE type, $stta_{t,sep}(k)=attr_{DIS}$ if the transition k is of the DISSOLVE type, $stta_{t,sep}(k)=attr_{WIPE}$ if the transition k is of the WIPE type, and $stta_{t,sep}(k)=attr_{SUBSHOT}$ if the transition k is a transition between two subordinate frame sequences of the same superordinate frame sequence, wherein a CUT is an abrupt transition and a FADE, DISSOLVE or WIPE is a gradual transition.

19. An apparatus for segmenting a video into scenes, comprising a hardware-implementation and configured to unite consecutive frame sequences of the video into scenes depending on types of frame sequence transitions at frame sequence boundaries between the frame sequences, the types distinguishing, at least, between gradual and abrupt frame sequence transitions, the hardware-implementation being configured to:
determine similarity values indicating a similarity between different frame sequences of the consecutive frame sequences;
modify each similarity value based on a type of a frame sequence transition between the different frame sequences of the consecutive frame sequences, the similarity between which is indicated by the respective similarity value, the types distinguishing, at least, between gradual and abrupt frame sequence transitions, the modification involving adding a value $stta_{t,sep}$ to the respective similarity value, the value $stta_{t,sep}$ being dependent on the type of the frame sequence transition between the different frame sequences of the consecutive frame sequences, the similarity between which is indicated by the respective similarity value in a manner equal for all similarity values, and in a manner according to which the value $stta_{t,sep}$ is different for gradual and abrupt frame sequence transitions; and uniting consecutive frame sequences into scenes based on the modified similarity values; wherein
a determination of the separating attraction $stta_{t,sep}(k)$ occurs by attraction values attr in dependence on the type of the transition, namely according to:

$stta_{t,sep}(k)=attr_{CUT}$ if the transition k is of the CUT type, $stta_{t,sep}(k)=attr_{FADE}$ if the transition k is of the FADE type, $stta_{t,sep}(k)=attr_{DIS}$ if the transition k is of the DISSOLVE type, $stta_{t,sep}(k)=attr_{WIPE}$ if the transition k is of the WIPE type, and $stta_{t,sep}(k)=attr_{SUBSHOT}$ if the transition k is a transition between two subordinate frame sequences of the same superordinate frame sequence, wherein a CUT is an abrupt transition and a FADE, DISSOLVE or WIPE is a gradual transition.

* * * * *